United States Patent
Bush et al.

(10) Patent No.: US 10,311,428 B2
(45) Date of Patent: Jun. 4, 2019

(54) SYSTEMS, METHODS, AND COMPUTER PROGRAM PRODUCTS FOR PROVIDING A CONTACTLESS PROTOCOL

(71) Applicant: GOOGLE INC., Mountain View, CA (US)

(72) Inventors: Larry L. Bush, Phoenix, AZ (US); Christopher J. Tomczak, Allen, TX (US)

(73) Assignee: GOOGLE LLC, Mountain View, CA (US)

( * ) Notice: Subject to any disclaimer, the term of this patent is extended or adjusted under 35 U.S.C. 154(b) by 511 days.

(21) Appl. No.: 13/901,188

(22) Filed: May 23, 2013

(65) Prior Publication Data
US 2013/0317927 A1 Nov. 28, 2013

Related U.S. Application Data

(60) Provisional application No. 61/651,276, filed on May 24, 2012, provisional application No. 61/772,260, (Continued)

(51) Int. Cl.
G06Q 20/32 (2012.01)
G06Q 20/34 (2012.01)
H04W 4/80 (2018.01)

(52) U.S. Cl.
CPC ....... *G06Q 20/3278* (2013.01); *G06Q 20/352* (2013.01); *H04W 4/80* (2018.02)

(58) Field of Classification Search
CPC .......................... G06Q 20/202; G06Q 20/3278
(Continued)

(56) References Cited

U.S. PATENT DOCUMENTS 5,590,038 A  12/1996 Pitroda ......................... 395/241
5,640,002 A   6/1997 Ruppert et al. ............... 235/472
(Continued)

FOREIGN PATENT DOCUMENTS

CA  2 381 614 A1   3/2001
CN  101567108 A   10/2009
(Continued)

OTHER PUBLICATIONS

Office Action received for Australian Patent Application No. 2013266229, dated Aug. 5, 2015, 2 pages.
(Continued)

*Primary Examiner* — A. Hunter Wilder
(74) *Attorney, Agent, or Firm* — Johnson, Marcou & Isaacs, LLC

(57) ABSTRACT

Systems, methods and computer program products are provided for managing contactless transactions. A first tap is performed when a system is placed within a predetermined proximity to a payment terminal. A first select command including an AID corresponding to a first application is received from the payment terminal. A first response based on the first select command is transmitted to the payment terminal. A data request including information indicating supported data types is received from the payment terminal. A second response based on the data request and including transaction data is transmitted to the payment terminal. The transaction data includes at least a portion of commerce data stored in the at least one memory.

17 Claims, 8 Drawing Sheets

Related U.S. Application Data filed on Mar. 4, 2013, provisional application No. 61/794,545, filed on Mar. 15, 2013.

(58) Field of Classification Search
USPC .................................................. 705/21, 64
See application file for complete search history.

(56) References Cited

U.S. PATENT DOCUMENTS

| | | | |
|---|---|---|---|
| 5,748,740 A | 5/1998 | Curry et al. | 380/25 |
| 5,805,702 A | 9/1998 | Curry et al. | 380/24 |
| 5,884,271 A | 3/1999 | Pitroda | 705/1 |
| 5,901,303 A | 5/1999 | Chew | 395/400 |
| 5,940,510 A | 8/1999 | Curry et al. | 380/25 |
| 5,949,880 A | 9/1999 | Curry et al. | 380/24 |
| 6,073,840 A | 6/2000 | Marion | 235/381 |
| 6,105,013 A | 8/2000 | Curry et al. | 705/65 |
| 6,116,505 A | 9/2000 | Withrow | 235/381 |
| 6,131,811 A | 10/2000 | Gangi | 235/380 |
| 6,237,095 B1 | 5/2001 | Curry et al. | 713/178 |
| 6,422,464 B1 | 7/2002 | Terranova | 235/384 |
| 6,587,835 B1 | 7/2003 | Treyz et al. | 705/14 |
| 6,601,759 B2 | 8/2003 | Fife et al. | 235/375 |
| 6,671,358 B1 | 12/2003 | Seidman et al. | 379/93.12 |
| 6,732,081 B2 | 5/2004 | Nicholson | 705/14 |
| 6,769,607 B1 | 8/2004 | Pitroda et al. | 235/380 |
| 6,813,609 B2 | 11/2004 | Wilson | 705/14 |
| 6,837,436 B2 | 1/2005 | Swartz et al. | 235/472.02 |
| 6,925,439 B1 | 8/2005 | Pitroda | 705/1 |
| 7,083,094 B2 | 8/2006 | Cooper | 235/449 |
| 7,110,792 B2 | 9/2006 | Rosenberg | 455/558 |
| 7,127,236 B2 | 10/2006 | Khan et al. | 455/414.1 |
| 7,155,405 B2 | 12/2006 | Petrovich | 705/26 |
| 7,194,422 B1 | 3/2007 | Killick | 705/14 |
| 7,216,109 B1 | 5/2007 | Donner | 705/64 |
| 7,249,112 B2 | 7/2007 | Berardi et al. | 705/79 |
| 7,286,818 B2 | 10/2007 | Rosenberg | 455/414.1 |
| 7,298,271 B2 | 11/2007 | Sprogis | 340/572.1 |
| 7,308,426 B1 | 12/2007 | Pitroda | 705/35 |
| 7,330,714 B2 | 2/2008 | Rosenberg | 455/412.1 |
| 7,349,885 B2 | 3/2008 | Gangi | 705/41 |
| 7,469,151 B2 | 12/2008 | Khan et al. | 455/558 |
| 7,469,381 B2 | 12/2008 | Ording | 715/702 |
| 7,483,858 B2 | 1/2009 | Foran et al. | 705/39 |
| 7,494,055 B2 | 2/2009 | Fernandes et al. | 235/380 |
| 7,529,563 B1 | 5/2009 | Pitroda | 455/558 |
| 7,571,139 B1 | 8/2009 | Giordano et al. | 705/40 |
| 7,581,678 B2 | 9/2009 | Narendra et al. | 235/451 |
| 7,613,628 B2 | 11/2009 | Ariff et al. | 705/14 |
| 7,631,810 B2 | 12/2009 | Liu et al. | 235/451 |
| 7,693,752 B2 | 4/2010 | Jaramillo | 705/26 |
| 7,708,198 B2 | 5/2010 | Gangi | 235/380 |
| 7,712,658 B2 | 5/2010 | Gangi | 235/380 |
| 7,775,430 B2 | 8/2010 | Lin | 235/383 |
| 7,805,615 B2 | 9/2010 | Narendra et al. | 713/186 |
| 7,828,214 B2 | 11/2010 | Narendra et al. | 235/451 |
| 7,856,377 B2 | 12/2010 | Cohagan et al. | 705/14.3 |
| 7,864,163 B2 | 1/2011 | Ording et al. | 345/173 |
| 7,942,337 B2 | 5/2011 | Jain | 235/492 |
| 7,954,715 B2 | 6/2011 | Narendra et al. | 235/451 |
| 7,954,716 B2 | 6/2011 | Narendra et al. | 235/451 |
| 7,954,717 B2 | 6/2011 | Narendra et al. | 235/451 |
| 7,961,101 B2 | 6/2011 | Narendra et al. | 340/572.1 |
| 7,967,215 B2 | 6/2011 | Kumar et al. | 235/492 |
| 7,991,158 B2 | 8/2011 | Narendra et al. | 380/260 |
| 8,072,331 B2 | 12/2011 | Narendra et al. | 340/572.1 |
| 8,083,145 B2 | 12/2011 | Narendra et al. | 235/451 |
| 8,091,786 B2 | 1/2012 | Narendra et al. | 235/451 |
| 8,131,645 B2 | 3/2012 | Lin et al. | 705/51 |
| 8,140,418 B1 | 3/2012 | Casey et al. | 705/35 |
| 8,396,808 B2 | 3/2013 | Greenspan | 705/64 |
| 8,429,046 B2 | 4/2013 | Pitroda | 705/35 |
| 2002/0049631 A1 | 4/2002 | Williams | 705/14 |
| 2002/0082921 A1 | 6/2002 | Rankin | 705/14 |
| 2002/0174025 A1 | 11/2002 | Hind et al. | 705/26 |
| 2002/0179703 A1 | 12/2002 | Allen | 235/381 |
| 2003/0009382 A1 | 1/2003 | D'Arbeloff et al. | 705/17 |
| 2003/0083042 A1 | 5/2003 | Abuhamdeh | 455/406 |
| 2003/0115126 A1 | 6/2003 | Pitroda | 705/36 |
| 2003/0132298 A1 | 7/2003 | Swartz et al. | 235/472.02 |
| 2003/0200489 A1 | 10/2003 | Hars | 714/703 |
| 2004/0073519 A1 | 4/2004 | Fast | 705/65 |
| 2004/0186768 A1 | 9/2004 | Wakim et al. | 705/14 |
| 2005/0004866 A1 | 1/2005 | Bonalle et al. | 705/39 |
| 2005/0171898 A1 | 8/2005 | Bishop et al. | 705/39 |
| 2005/0222961 A1 | 10/2005 | Staib et al. | 705/64 |
| 2005/0234769 A1 | 10/2005 | Jain et al. | 705/14 |
| 2005/0247777 A1 | 11/2005 | Pitroda | 235/380 |
| 2006/0287004 A1 | 12/2006 | Fuqua | 455/558 |
| 2007/0014407 A1 | 1/2007 | Narenda et al. | 380/259 |
| 2007/0014408 A1 | 1/2007 | Narenda et al. | 380/270 |
| 2007/0198432 A1 | 8/2007 | Pitroda et al. | 705/64 |
| 2008/0306849 A1 | 12/2008 | Johnson, Jr. et al. | 705/35 |
| 2009/0103730 A1 | 4/2009 | Ward et al. | |
| 2009/0108064 A1 | 4/2009 | Fernandes et al. | 235/380 |
| 2009/0144164 A1 | 6/2009 | Wane et al. | |
| 2009/0164322 A1 | 6/2009 | Khan et al. | 705/14 |
| 2010/0051685 A1 | 3/2010 | Royyuru et al. | 235/379 |
| 2010/0211504 A1 | 8/2010 | Aabye et al. | 705/44 |
| 2010/0241494 A1 | 9/2010 | Kumar et al. | 705/14.1 |
| 2010/0274722 A1 | 10/2010 | Roberts et al. | |
| 2011/0073663 A1 | 3/2011 | Narendra et al. | 235/492 |
| 2011/0171996 A1 | 7/2011 | Narendra et al. | 455/558 |
| 2011/0223972 A1 | 9/2011 | Narendra et al. | 455/558 |
| 2011/0231238 A1 | 9/2011 | Khan et al. | 705/14.26 |
| 2011/0244796 A1* | 10/2011 | Khan | H04W 4/008 455/41.1 |
| 2011/0246316 A1 | 10/2011 | Cincera | 705/17 |
| 2011/0269438 A1 | 11/2011 | Narendra et al. | 455/414.1 |
| 2011/0271044 A1 | 11/2011 | Narendra et al. | 711/103 |
| 2011/0272468 A1 | 11/2011 | Narendra et al. | 235/492 |
| 2011/0272469 A1 | 11/2011 | Narendra et al. | 235/492 |
| 2012/0011070 A1 | 1/2012 | Ward et al. | |
| 2012/0064828 A1 | 3/2012 | Khan et al. | 455/41.1 |
| 2012/0109764 A1 | 5/2012 | Martin et al. | 705/17 |
| 2012/0123847 A1 | 5/2012 | Wane et al. | |
| 2012/0143702 A1 | 6/2012 | Ho | |
| 2012/0143703 A1 | 6/2012 | Wall et al. | |
| 2012/0143706 A1 | 6/2012 | Crake et al. | |
| 2012/0323664 A1 | 12/2012 | Klems | 705/14.26 |
| 2013/0046643 A1 | 2/2013 | Wall et al. | |
| 2013/0086375 A1 | 4/2013 | Lyne et al. | |
| 2013/0097080 A1* | 4/2013 | Smets | G06T 1/20 705/44 |
| 2013/0110719 A1 | 5/2013 | Carter et al. | |
| 2013/0267176 A1 | 10/2013 | Hertel et al. | |
| 2013/0282459 A1* | 10/2013 | Smets | G06Q 20/045 705/14.23 |
| 2013/0317924 A1 | 11/2013 | Bush et al. | |
| 2014/0058937 A1 | 2/2014 | Watson | 705/41 |

FOREIGN PATENT DOCUMENTS

| | | |
|---|---|---|
| CN | 102404025 A | 4/2012 |
| EP | 1 222 503 A2 | 7/2002 |
| EP | 0 766 852 B1 | 8/2004 |
| EP | 1 412 890 A4 | 11/2004 |
| EP | 1 477 943 A2 | 11/2004 |
| JP | 2001-222672 A | 8/2001 |
| JP | 2004-258740 A | 9/2004 |
| JP | 2007-249544 A | 9/2007 |
| JP | 2010-218450 A | 9/2010 |
| JP | 2012-510664 A | 5/2012 |
| KR | 10-2006-0005821 A | 1/2006 |
| KR | 10-2008-0066715 A | 7/2008 |
| KR | 10-2009-0107531 A | 10/2009 |
| WO | WO 01/18629 A3 | 3/2001 |
| WO | WO 03/012717 A1 | 2/2003 |
| WO | WO 2010/042560 A2 | 4/2010 |
| WO | 2013177412 A2 | 11/2013 |
| WO | 2013177416 A2 | 11/2013 |
| WO | 2013177412 A3 | 4/2014 |
| WO | 2013177416 A3 | 5/2014 |

(56) References Cited

FOREIGN PATENT DOCUMENTS

OTHER PUBLICATIONS

Office Action received for Australian Patent Application No. 2013266233, dated Aug. 5, 2015, 2 pages.
Office Action received for Canada Patent Application No. 2874649, dated Sep. 14, 2015, 3 pages.
Office Action received for Canada Patent Application No. 2874652, dated Aug. 6, 2015, 3 pages.
International Preliminary Report on Patentability and Written Opinion Received for PCT Patent Application No. PCT/US2013/042451, dated Dec. 4, 2014, 12 pages.
International Preliminary Report on Patentability and Written Opinion Received for PCT Patent Application No. PCT/US2013/042455, dated Dec. 4, 2014, 14 pages.
Int'l Search Report and Written Opinion of the Int'l Searching Authority for Int'l Appl'n No. PCT/US2013/042455, 9 pages, dated Mar. 6, 2014.
Int'l Search Report and Written Opinion of the Int'l Searching Authority for Int'l Appl'n No. PCT/US2013/042451, 8 pages, dated Mar. 6, 2014.
U.S. Appl. No. 13/901,134 to Bush et al., filed May 23, 2013.
Buchanan, "U.S. Office Action issued in copending U.S. Appl. No. 13/901,134, filed May 23, 2013", dated Mar. 10, 2016, 8 pages.
Buchanan, "U.S. Office Action issued in copending U.S. Appl. No. 13/901,134, filed May 23, 2013", dated Sep. 13, 2016, 9 pages.
Kojima, "Japanese Office Action issued in Japanese Application No. 2015-514187", dated Apr. 4, 2016, 6 pages of English Translation and 5 pages of Japanese Office Action.
Melis, "European Search Report issued in European Application No. 13732662.5", dated Nov. 6, 2015, 3 pages.
Melis, "Extended European Search Report issued in European Application No. 13727008.8", dated Nov. 6, 2015, 9 pages.
Miyaji, "Japanese Office Action issued in Japanese Application No. 2015-514190", dated Feb. 8, 2016, 3 pages of English Translation and 3 pages of Japanese Office Action.
Miyaji, "Japanese Office Action issued in Japanese Application No. 2015-514190", dated May 30, 2016, 3 pages of English Translation and 3 pages of Japanese Office Action.
Rees, "Australian Office Action issued in Australian Application No. 2013266229", dated Jul. 6, 2016, 3 pages.
Rees, "Office Action issued in Australian Application No. 2013266229", dated Feb. 26, 2016, 3 pages.
Rees, "Office Action issued in Australian Application No. 2013266229", dated Mar. 2, 2016, 3 pages.
Yune, "Office Action issued in Chinese Application No. 201380027257. X", dated Sep. 18, 2016, 8 pages of English Translation and 8 pages of Chinese Office Action.
Alvear, "Mexican Office Action issued in Mexican Application No. MX/a/2014/014330", dated Mar. 15, 2017, 3 pages of English Translation and 3 pages of Mexican Office Action.
Jing, "Chinese Office Action issued in Chinese Application No. 201380027251.2", dated Feb. 13, 2017, 11 pages of English Translation and 8 pages of Chinese Office Action.
Unknown, "Chinese Office Action issued in Chinese Application No. 201380027251.2", dated Feb. 13, 2017, 8 pages of Chinese Office Action only.
Rabbi, "Australian Office Action issued in Australian Application No. 2016203470", dated Mar. 1, 2017, 4 pages.
Kojima, "Japanese Office Action issued in Japanese Application No. 2015-514187", dated Jan. 23, 2017, 6 pages of English Translation and 5 pages of Japanese Office Action.
Rees, "Australian Office Action issued in Australian Application No. 2016208396", dated Jun. 23, 2017, 2 pages.
Kojima, "Japanese Office Action issued in Japanese Application No. 2015-514187", dated Jul. 3, 2017, 3 pages of English Translation and 3 pages of Japanese Office Action.
Melis, "European Office Action issued in European Application No. 13732662.5", dated Aug. 9, 2017, 10 pages.
Buchanan, "U.S. Office Action issued in copending U.S. Appl. No. 13/901,134, filed May 23, 2013", dated May 22, 2017, 10 pages.
"Chinese Office Action issued in Chinese Application No. 201380027257.X", dated May 26, 2017, 9 pages of Chinese Office Action only.
"Mexican Office Action issued in Mexican Application No. MX/a/2014/014330", dated Sep. 6, 2017, 5 pages of English Translation and 4 pages of Mexican office Action.
Buchanan, "U.S. Office Action issued in copending U.S. Appl. No. 13/901,134, filed May 23, 2013", dated Oct. 27, 2017, 11 pages.
Jing, "Chinese Office Action issued in Chinese Application No. 201380027251.2", dated Oct. 25, 2017, 13 pages of English Translation and 7 pages of Chinese Office Action.
Rabbi, "Australian Office Action issued in Australian Application No. 2016203470", dated Nov. 22, 2017, 4 pages.
Yuner, "Chinese Office Action issued in Chinese Application No. 201380027257.X", dated Dec. 5, 2017, 06 pages of Chinese Office Action only.
Alvear, "Mexican Office Action issued in Mexican Application No. MX/a/2014/014330", dated Feb. 22, 2018, 7 pages of English Translation and 6 pages of Mexican Office Action.
Melis, "European Office Action issued in European Application No. 13727008.8", dated Mar. 28, 2018 5 pages.
Ziaie, "Canada Office Action received for Canada Patent Application No. 2,874,652", dated Feb. 21, 2018, 3 pages.
Ziaie, "Canada Office Action received for Canada Patent Application No. 2,874,649", dated Feb. 21, 2018, 3 pages.
Yuner, "Chinese Office Action issued in Chinese Application No. 201380027257.X", dated May 15, 2018, 3 pages.
Yook, "Korean Office Action issued in Korean Application No. 10-2014-7035328", dated Sep. 11, 2018, 7 pages of English Translation and 6 pages of Korean Office Action.
Buchanan "U.S. Office Action issued in co-pending U.S. Appl. No. 13/901,134, filed May 23, 2013", dated Dec. 21, 2018, 13 pages.
Buchanan, "U.S. Office Action issued in copending U.S. Appl. No. 13/901,134, filed May 23, 2013", dated Jul. 25, 2018, 14 pages.
Jang, "Chinese Office Action issued in Chinese Application No. 201380027251.2", dated Jul. 25, 2018, 11 pages of English Translation and 6 pages of Chinese Office Action.
"Australian Office Action issued in Australian Application No. 2018200554", dated Nov. 16, 2018, 4 pages.
Youk, "Korean Office Action issued in Korean Application No. 10-2014-7035327", dated Jun. 20, 2018, 3 pages of English Translation and 3 pages of Korean Office Action.
Yook "Korean Office Action issued in Korean Application No. 10-2014-7035328 (GOOG-2554-2KR)", dated Jan. 21, 2019, 04 pages of English Translation and 04 pages of Korean Office Action.
Yook "Korean Office Action issued in Korean Application No. 10-2018-7029518", dated Feb. 9, 2019, 8 pages of English Translation and 6 pages of Korean Office Action.
"Japanese Office Action issued in Japanese Application No. 2015-514187", dated Feb. 8, 2019, 6 pages of English Translation and 5 pages of Japanese Office Action.
Melis "European Office Action issued in European Application No. 13732662.5", dated Mar. 11, 2019, 8 pages.
U.S. Appl. No. 16/361,167 to Bush et al. filed Mar. 21, 2019.

* cited by examiner

SYSTEMS, METHODS, AND COMPUTER PROGRAM PRODUCTS FOR PROVIDING A CONTACTLESS PROTOCOL

CROSS REFERENCE TO RELATED APPLICATIONS

This application claims priority to U.S. Provisional Application Nos. 61/651,276, filed May 24, 2012; 61/772,260, filed Mar. 4, 2013; and 61/794,545, filed Mar. 15, 2013. The contents of these applications are hereby incorporated by reference herein.

BACKGROUND

Field

Example aspects described herein relate generally to contactless protocols and more particularly to systems, methods, and computer program products for providing a contactless protocol allowing interoperation between mobile devices, near field communication (NFC) readers, and point of sale (POS) systems.

Related Art

NFC technology is a standards-based wireless communication technology that allows data to be exchanged between devices that are positioned within a certain proximity, generally less than ten centimeters apart. One use of such NFC technology is for making contactless transactions, including those for payment, access and ticketing. For example, an NFC-enabled mobile device can be provisioned with a payment application and payment account information (i.e., credentials associated with a financial instrument such as credit or debit card) issued by a consumer's financial institution. Each payment application can store and manage multiple sets of commerce data associated with multiple merchants, manufacturers or brands on a secure element. The application and payment account information are typically encrypted and stored in a secure area in the mobile device. The mobile device can, in turn, use the NFC technology to communicate with NFC-enabled point of sale (POS) systems at attended locations such as stores and unattended locations such as vending machines. To pay, the consumer simply brings the mobile device to within approximately ten centimeters of a contactless payment-capable POS system and the transaction occurs. The process is typically the same as that used by the contactless credit and debit cards.

Placing the mobile device or contactless credit or debit card near an NFC-enabled reader so that they can be communicatively coupled is sometimes referred to as a "wave" or "tap". An application for a mobile device that allows consumers to "tap to pay" at a NFC-enabled POS systems is generally referred to as a "wallet application" or "mobile wallet client application." An application related to payments is generally referred to as a "payment" application. Common contactless payment applications are facilitated using any of the following technologies: American Express® "ExpressPay," Discover® "ZIP," Mastercard® "PayPass" or Visa® "PayWave".

NFC can also be used to read information about products or receive special offers, loyalty or rewards information from, for example, NFC tags, smart posters or smart billboards. An application related to offers, loyalty and rewards is generally referred to herein as a "commerce" application.

One technical challenge associated with utilizing payment and commerce technologies cooperatively involves the ability to allow the same tap event that sends payment information to include additional information associated with merchant loyalty cards, offers, rewards, and the like. To this end, messaging technologies in existing NFC readers or NFC-enabled payment POS terminals stand to be upgraded to effectively support a messaging technology that retrieves and/or receives both payment credentials (using the aforementioned payment protocols) and additional commerce data (loyalty, offers, rewards, etc.) from mobile devices used to perform the transactions. Yet another technical challenge involves publishing commerce elements (e.g., offers, loyalty card credentials, rewards, and the like) into a mobile device such that those commerce elements may, in turn, be presented as part of a typical POS transaction (e.g., a purchase).

BRIEF DESCRIPTION

The example embodiments presented herein meet the above-identified needs by providing systems, methods and computer program products for providing a contactless protocol.

In one embodiment, a system for managing contactless transactions includes at least one memory operable to store commerce data and financial instrument data, and at least one processor coupled to the at least one memory. A first tap is performed, the first tap occurring when the system is placed within a predetermined proximity to a payment terminal. A first select command including an AID corresponding to a first application is received from the payment terminal. A first response based on the first select command is transmitted to the payment terminal. A data request including information indicating supported data types is received from the payment terminal. A second response based on the data request and including transaction data is transmitted to the payment terminal. The transaction data includes at least a portion of the commerce data stored in the at least one memory.

In another embodiment, a method for managing contactless transactions includes: performing a first tap, the first tap occurring when a mobile device is placed within a predetermined proximity to a payment terminal; receiving from the payment terminal a first select command including an AID corresponding to a first application; transmitting to the payment terminal a first response based on the first select command; receiving from the payment terminal a data request including information indicating supported data types; and transmitting to the payment terminal a second response based on the data request, the second response including transaction data. The transaction data includes at least a portion of commerce data stored in at least one memory.

In another embodiment, a non-transitory computer-readable medium has sequences of instructions stored thereon for causing one or more processors to: perform a first tap, the first tap occurring when a mobile device is placed within a predetermined proximity to a payment terminal; receive from the payment terminal a first select command including an AID corresponding to a first application; transmit to the payment terminal a first response based on the first select command; receive from the payment terminal a data request including information indicating supported data types; and transmit to the payment terminal a second response based on the data request, the second response including transaction data. The transaction data includes at least a portion of commerce data stored in at least one memory.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

Figure 1:
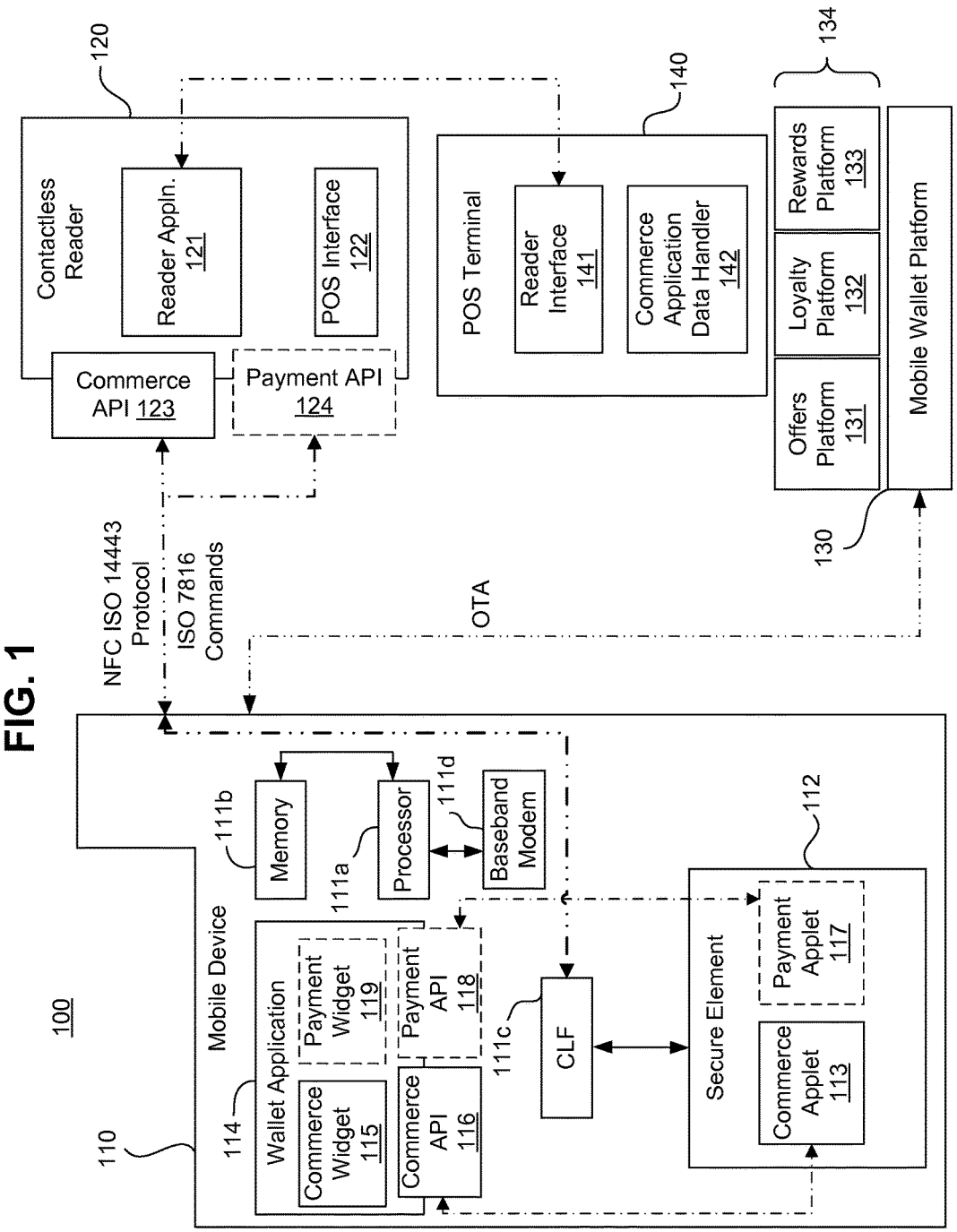
FIG. 1 is a graphical representation of a platform architecture in accordance with an exemplary embodiment.

The example embodiments presented herein are directed to systems, methods and computer program products for providing a contactless protocol, which are now described herein in terms of an example merchant transaction. This description is not intended to limit the application of the example embodiments presented herein. In fact, after reading the following description, it will be apparent to one skilled in the relevant art(s) how to implement the following example embodiments in alternative embodiments (e.g., involving mass transit transactions requiring a wireless communications connection between a mass transit terminal and a mobile device).

The terms "application," "applet," "widget," and/or the plural form of these terms are used interchangeably herein to refer to an application (functioning independently or in conjunction with other applications) or set or subset of instructions or code, which when executed by one or more processors (e.g., in a mobile device, card reader, terminal, point of sale (POS) system, or server) causes the processor (s) to perform specific tasks. For example, a wallet application can be used to conduct transaction- or interface-related functions such as storing, processing, accessing or transmitting financial, loyalty, offer, membership, or account data. A wallet application may also incorporate or interact with one or more payment applications, such as ExpressPay from American Express®, Discover® Network Zip$^{SM}$, MasterCard® PayPass™ and Visa payWave™ payment applets.

Generally, commerce-related services are made available through a suite of applications available on several different platforms. The first application (or suite of applications) exists onboard a server within a mobile commerce (MoCom) platform. The MoCom platform is responsible for the management of consumer data, including loyalty accounts and offers. In addition, the MoCom platform serves as a campaign manager for offers, providing a remote data store for offers made available to the consumer via the available merchant portals within a wallet application.

A second application exist onboard a mobile device in the form of a wallet application. The wallet application provides the consumer's primary user interface (UI) and additional commerce application services through which the wallet application may access additional resources onboard a secure element (SE) of a mobile device.

A third application exists onboard a secure element of a mobile device in the form of JavaCard applet. This applet stores commerce-related data such as loyalty and offer data and provides an interface through which the data may be managed. The applet is accessible through the use of Application Protocol Data Unit (APDU) commands as defined in International Standards Organization (ISO) 7816-4.

The fourth application exists onboard an NFC-enabled reader (referred to herein simply as a "reader"). The reader can be either a stand-alone device or attached to (and managed by) a point of sale (POS) terminal. This application facilitates or provides access to the interface with a secure element on a mobile device, performing specific tasks that optimize the APDU command/data exchange tasks. For example, it includes the reading of loyalty or offer information following the placement of a mobile device in proximity of a reader (i.e., a "tap").

A fifth application (or suite of applications) exists onboard a merchant POS system, including a POS terminal and any additional merchant-specific hardware/software. These applications manage the data related to payment/loyalty/ offers/rewards received from a secure element on a mobile device via a reader. In most cases, this data will then be forwarded to a corresponding MoCom or merchant specific platform(s).

FIG. 1 is a graphical representation of a platform architecture in accordance with an exemplary embodiment. As shown in FIG. 1, system 100 includes a mobile device 110 communicatively coupled to a contactless (e.g., proximity or NFC) reader 120 and a mobile wallet platform 130. Reader 120 also is communicatively coupled to a POS terminal 140. POS terminal 140 may be within the same housing as reader 120. Alternatively, POS terminal 140 and reader 120 are communicatively coupled with each other but each of these components is housed separately.

Mobile device 110 may be, for example, a cellular phone or the like, and includes a processor 111a, memory 111b, a contactless frontend (CLF) 111c, a baseband modem 111d, and a user interface such as a display (not shown). Baseband modem 111d is a digital modem that is used for mobile network communications. CLF 111c is circuitry which handles the analog aspect of contactless or NFC communications and the communication protocol layers of a contactless transmission link. CLF 111c also is used to exchange data between reader 120 and a secure element (or SE) 112 contained in mobile device 110, for example, to execute contactless transactions.

Secure element 112 may be implemented as a Universal Integrated Circuit Card (UICC), embedded SE card, secure micro secure digital (microSD) card, and the like. Secure element 112 is generally considered secure because it is a self-contained system, including dedicated memory, and is protected by hardware and software hardening techniques that are verified by independent testing.

Secure element 112 includes (e.g., stored thereon) one or more commerce applets 113. Each commerce applet 113 is associated with a commerce service and an account issued by a commerce service provider (SP). A service provider is a company, organization, entity, or the like, that provides services to customers or consumers. Examples of service providers include account-issuing entities such as banks, merchants, card associations, marketing companies, and transit authorities. A service may be an activity, capability, functionality, work, or use that is permitted or provided by a service provider, such as a payment service, credit, debit, checking, gift, offer or loyalty service, transit pass service, and the like.

A commerce service provider can provision (or have provisioned) onto secure element 112 one or more separate commerce applets 113. In addition, other independent service providers can provision (or have provisioned) onto secure element 112 their own commerce applet(s) 113. Generally, a commerce applet 113 stores both loyalty and offers related data, providing an APDU interface through which this data can be managed. Commerce applet 113 operates as a generic storage container, allowing multiple loyalty/offers services to share mechanisms (e.g., secure element, mobile device) for loyalty/offer data management. If memory restrictions and performance requirements limit the amount of loyalty/offers data that can be stored on secure element 112, additional data can be stored in mobile device memory 111b and managed by the consumer via commerce widget 115. For example, any graphic images related to an offer can be stored in memory 111b in order to optimize secure element memory allocation. Loyalty/offers data management can be handled by the corresponding offer platform 131, loyalty platform 132, or rewards platform 133.

Commerce applet 113 includes a cached merchant data table enabling the storage/management of all data related to a given merchant. This allows the commerce data for a given merchant to be pre-loaded in secure element 112 or mobile device 110 by a wallet application. Exemplary commerce elements (and their corresponding tag values used during Tag Length Value (TLV) encoding) that are included in the cached merchant data table are defined below. This data is stored in a record oriented data buffer. In an exemplary embodiment, a merchant identifier (Merchant Identifier) is used as the key field for search/retrieval tasks. Optionally, an index (or hash table) may be created to improve performance.

One or more commerce applets 113 can be loaded onto the secure element 112, for example, during manufacture and/or configuration of the secure element 112 and may be personalized to enable its use to conduct commerce transactions. A commerce applet 113 interfaces with reader 120 via a commerce application programming interface (API) 123. In an exemplary embodiment, a commerce applet 113 is in the form of a JavaCard applet and is accessible through the use of APDU commands as defined in ISO 7816-4. Particularly, commerce applet 113 communicates commerce elements to reader 120 via secure element 112 using ISO 7816 commands over the NFC ISO 14443 protocol.

Secure element 112 can also include one or more payment applets 117 where each payment applet 117 is associated with a payment service and an account issued by a payment service provider. One or more payment applets 117 also can be loaded onto the secure element 112, for example, during manufacture and/or configuration of the secure element 112 and may be personalized to enable its use to conduct payment transactions. A payment applet 117 interfaces with reader 120 via API 124. In an exemplary embodiment, payment applet 117 is in the form of a JavaCard applet and is accessible through the use of APDU commands as defined in ISO 7816-4. Payment applet 113 also communicates payment elements to reader 120 via secure element 112 using ISO 7816 commands over the NFC ISO 14443 protocol.

It should be understood that other communications between the aforementioned devices may include communications with or through other intervening systems, hardware, and/or software, and such communications may include receiving, transferring, and/or managing data.

A wallet application 114 stored on mobile device 110 includes instructions which, when executed by the processor of the mobile device 110, cause the mobile device 110 to act as an instrument, for example, for processing transactions such as contactless commerce and/or payment transactions. Wallet application 114 communicates, through the use of APDU commands as defined in ISO 7816-4, with the commerce applet 113 via commerce API 116 and to payment applet 117 via payment API 118.

Commerce widget 115 is a component of the wallet application 114 that provides an interface for consumers to manage commerce elements (e.g., loyalty card credentials, offers and rewards), for example, through interactions with the display or user interface of a mobile device. Commerce widget 115 maintains, for example, a master list of commerce elements present on the handset in a memory of the mobile device (e.g., 111b). A subset of offers that have been identified as ready to be used are, in turn, moved to secure element 112 to be communicated to contactless reader 120 and POS terminal 140. Sensitive information, such as loyalty account identifiers can be stored on secure element 112.

Payment widget 119 is a component of the wallet application 114 that provides an interface for consumers to manage payment elements (e.g., credit or debit card credentials), for example, through interactions with the display or user interface of a mobile device.

Reader 120 includes a reader commerce application 121 (referred to herein simply as a "reader application") and a POS interface 122. Reader 120 manages two interfaces: one interface is with the secure element 112 in the mobile device 110 and the other interface is with POS terminal 140 which includes a reader interface 141 and a commerce application data handler 142. The functionality of reader 120 is the same whether reader 120 is standalone and connected to a payments terminal or merchant POS, or is integrated therein. Contactless payment functionality is also contained in reader 120 but is not shown.

Mobile device 110 is further communicatively coupled to a mobile wallet platform 130, which in turn is communicatively coupled to offers platform 131, loyalty platform 132 and rewards platform 133. Collectively, offers platform 131, loyalty platform 132 and rewards platform 133 can be referred to as a mobile commerce (MoCom) platform 134 and are implemented on one or more servers, referred to herein individually and collectively as a MoCom server (now shown).

In one embodiment, a customer may use mobile device 110 to conduct a contactless transaction at a POS equipped with reader 120. The customer places the mobile device 110 within a predetermined required proximity of the contactless reader 120 (i.e., taps) causing CLF 111c of the mobile device 110 to communicate with reader 120 using, for example, NFC ISO 14443 protocols. Reader 120 also communicates with wallet application 114, commerce applet 113, and/or payment applications on the mobile device 110 to execute contactless transactions.

A secure element employs a Proximity Payment System Environment (PPSE) that serves as a directory of available credentials currently stored in secure element 112. Each credential is assigned a corresponding application identifier (AID) associated with a payment application and stored in the PPSE. When an NFC enabled-mobile device containing secure element 112 is placed in the vicinity of an NFC-enabled contactless reader, the contactless reader reads the credential and completes the transaction. Before doing so, however, the reader is initialized.

On mobile device 110, PPSE is an application used to maintain a list of payment applications stored on secure element 112, and provides accessibility to each payment application stored on the mobile device 112 by making them visible or not visible (i.e., accessible) to systems or devices.

Reader Initialization

Initialization of the reader 120 will now be described in more detail. In one embodiment, reader 120 implements a function referred to as an Entry Point Manager (EPM) to control which application in a mobile device is selected. In this embodiment, EPM controls whether reader 120 sends a command to mobile device 110 to select an application that performs a commerce transaction or a command that performs a payment transaction. A command to select a commerce application is referred to herein as "Select Commerce." A command to select a payment application is referred to herein as "PPSE Select."

EPM also controls the start mode for the reader 120 and subsequent application switching during a checkout process. EPM thus facilitates switching (at reader 120) between the Select Commerce command for a commerce transaction and the PPSE Select command for payment transactions.

Commencing a Commerce Transaction on a Reader

A reader can be configured to initiate a commerce transaction on a reader according to several modes, which are described below in further detail. In one mode, referred to as "auto start", reader application 121 is the default application on the reader 120. Being the default application allows reader application 121 to be available to the consumer as a first tap option (i.e., upon an initial coupling communication between the mobile device 110 and contactless reader 120).

Another mode, referred to as "manual start," allows manual intervention to be used to initiate reader commerce application 121. Manual intervention can be in the form of a command from POS terminal 130 (e.g., initiated by using a POS terminal interface) or from a consumer selecting a commerce application on a mobile device by using commerce widget 115.

Another mode, referred to as "payment with post transaction data," involves controlling how payments are handled in an activity stream. If a merchant supports the provisioning of post transaction data, for example, then payment and receipt of merchant data can be accomplished by the same tap event, such as after the final total for a transaction has been calculated.

Another mode is referred to as "payment first," The payment first option works in conjunction with the auto start mode and/or the manual start mode to initiate a PPSE Select command for payment and then a Select Commerce command to obtain commerce data (e.g., loyalty data, offer data, reward data, and the like). Commerce data is interchangeably referred to herein as "commerce elements."

Auto Start Mode

Referring to FIG. 1, auto start mode provides commerce functionality on reader 120 at the beginning of a POS checkout process. When mobile device 110 taps reader 120, reader application 121 causes reader 120 to send a "Select Commerce" message to mobile device 110 including the AID corresponding to the commerce application to be used to execute a contactless transaction. If the message is accepted by mobile device 110 it sends a positive response message in return. Next, reader 120 sends mobile device 110 a "Get Commerce Data" command. The Get Commerce Data command contains merchant specific data that secure element 112 uses to perform a commerce transaction. Also, control passes to the mobile device 110 upon successful completion of the Get Commerce Data transaction. If reader 120 receives a negative response to "Select Commerce" message it passes control back to the EPM.

Manual Start Mode

Referring still to FIG. 1, in manual startup mode, reader 120 starts reader application 121 in response to a request from either the consumer or the POS terminal 140. In this manual start mode, at the beginning of a checkout process, reader 120 is in a PPSE select state. For a consumer initiated commerce transaction, the consumer selects the commerce application at the customer facing device (e.g., commerce widget 115). The customer facing device then sends a command to reader 120 to start the reader application 121 via the EPM. For a POS terminal initiated commerce transaction, POS terminal 140 commands reader 120 to initialize the reader application 121. In one embodiment, this is initiated by a cashier via an interface on the POS terminal 140.

Once reader commerce application 121 has been started on reader 120, the commerce application will function as described in the auto start mode above.

Payment with Post Transaction Data

In payment with post transaction data mode, a payment transaction can be made such that post transaction data is communicated between POS terminal 140, reader 120, and secure element 112. This option allows the commerce protocol to start at the beginning of the consumer checkout, but payment is not requested by the reader 120 until the final transaction total has been calculated.

POS terminal 140 sends a "Post Transaction" command to reader 120 with, for example, a transaction identifier (ID) and redeemed coupon IDs. Reader 120 then transmits a request for a tap for payment. The tap allows reader 120 to first request payment credentials from secure element 112 and then cause the reader application 121 to send commerce data (e.g., coupon data) to secure element 112. Both functions are performed in a single tap by the mobile device 110 at reader 120.

Payment First

In payment first mode, a payment can be made first, prior to a commerce transaction. This option accommodates a situation where the payment/PPSE process must precede any commerce processing. Payment first mode works in conjunction with both auto and the manual start modes discussed above. Payment and commerce processing is accomplished in a single tap.

Exemplary Commerce Process Flows

Normal Commerce Process Flow (Single Tap)

Figure 2:
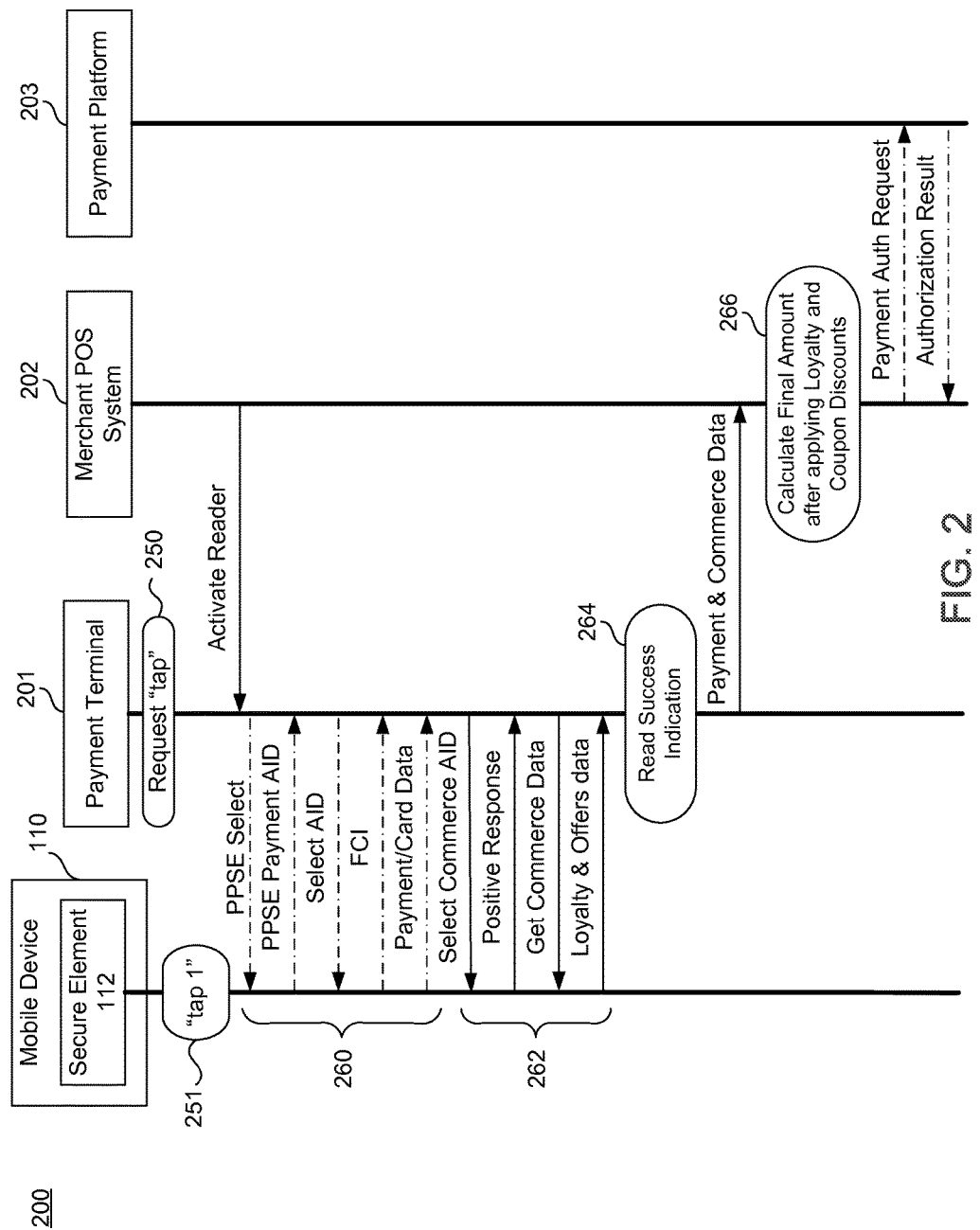
FIG. 2 illustrates a single tap timing diagram according to an exemplary embodiment.

FIG. 2 illustrates a single tap timing diagram 200 according to an exemplary embodiment. The following process flow can commence as items being purchased are being scanned at a POS. For convenience, reader 120 (FIG. 1) and POS terminal 140 (FIG. 1) are illustrated as a single component and collectively referred to as payment terminal 201. Each component (i.e., reader 120 or POS terminal 140) is referred to individually when applicable.

A merchant POS system 202 can be a merchant server operated by a merchant which controls the operation of payment terminal 201. In an exemplary embodiment, merchant POS system 202 commands payment terminal 201 to activate the reader ("Activate Reader") before items are being scanned, as items are being scanned, or after the items are scanned. In each case, reader 120 requests a user (or consumer) to place a mobile device 110 in proximity of reader 120, as shown in step 250 ("Request 'tap'"). In response to a request for the user to place a mobile device 110 in proximity of reader 120 (step 250), a consumer taps mobile device 110 onto reader 120, as shown in step 251.

Once a NFC connection has been established between mobile device 110 and reader 120, the following command exchanges are initiated for service initialization and processing of both a payment transaction and a commerce transaction. Payment transaction initialization and processing exchanges between secure element 112 and reader 120 include steps 260 and commerce transaction initialization and processing exchanges between secure element 112 and reader 120 include steps 262. Steps 260 may be performed before steps 262, afterward, or substantially simultaneously.

Referring first to steps 262, after a mobile device has tapped reader 120, reader 120 sends to secure element 112 a Select Commerce command along with a particular commerce AID ("Select Commerce AID") indicating which commerce applet within secure element 112 it seeks to cooperate with (e.g., commerce applet 113). In response, secure element 112 sends a positive or negative response. A negative response (not shown) results in reader 120 terminating reader application 121 (FIG. 1) and passing control to the EPM (not shown). If the response is positive ("Positive Response"), then reader 120 sends a command ("Get Commerce Data") to secure element 112 specifying identifying information, such as a merchant/store identifier, and any additional loyalty, offer or reward schemes supported by that location, date and time information, the version of reader commerce application 121 supported by reader 120, and any merchant capability data.

Secure element 112 returns corresponding commerce elements (e.g., loyalty data, offer data, reward data) to reader 120 ("Loyalty & Offers Data") based on the fields in the Get Commerce Data command received from reader 120. In one embodiment, commerce applet 113 builds a package containing the commerce data (e.g., a buffer or set of buffers including loyalty data, offer data, or rewards data). In another embodiment, the buffer is pre-built using memory space in the secure element 112.

Referring to steps 260, in one embodiment, reader 120 begins payment processing by sending a PPSE request ("PPSE Select") to secure element 112.

If the Select Commerce AID and PPSE Select requests are successful, as shown in step 264 ("Read Success Indication"), payment terminal 201 forwards the commerce application data and payment credentials it has received to the merchant POS system 202 for processing ("Payment & Commerce Data"). Merchant POS system 202, in turn, records the loyalty identifier and offers (not shown) and applies any applicable discounts as product scanning continues as shown in step 266. This concludes the commerce application process and the payment processing proceeds.

Once scanning has completed and a transaction amount has been approved for payment, a payment authorization request to a payment platform 203 is made ("Payment Auth Request"). In turn, payment platform 203 returns an authorization result ("Authorization Result") indicating whether or not the payment has been authorized.

Referring again to steps 260, in one embodiment, a PPSE Select request by reader 120 to secure element 112 causes secure element 112 to return a PPSE payment AID indicating which payment applet (and hence which corresponding payment network) should be used to perform the payment transaction ("PPSE Payment AID"). In response, reader 120 sends a Select AID indicating that it supports the particular applet ("Select AID"). File control information (FCI) associated with the payment applet (e.g., FIG. 1, 117) is sent by secure element 112 to reader 120. Similarly, other payment and card information is sent by secure element 112 to reader 120 ("Payment/Card Data").

Figure 3:
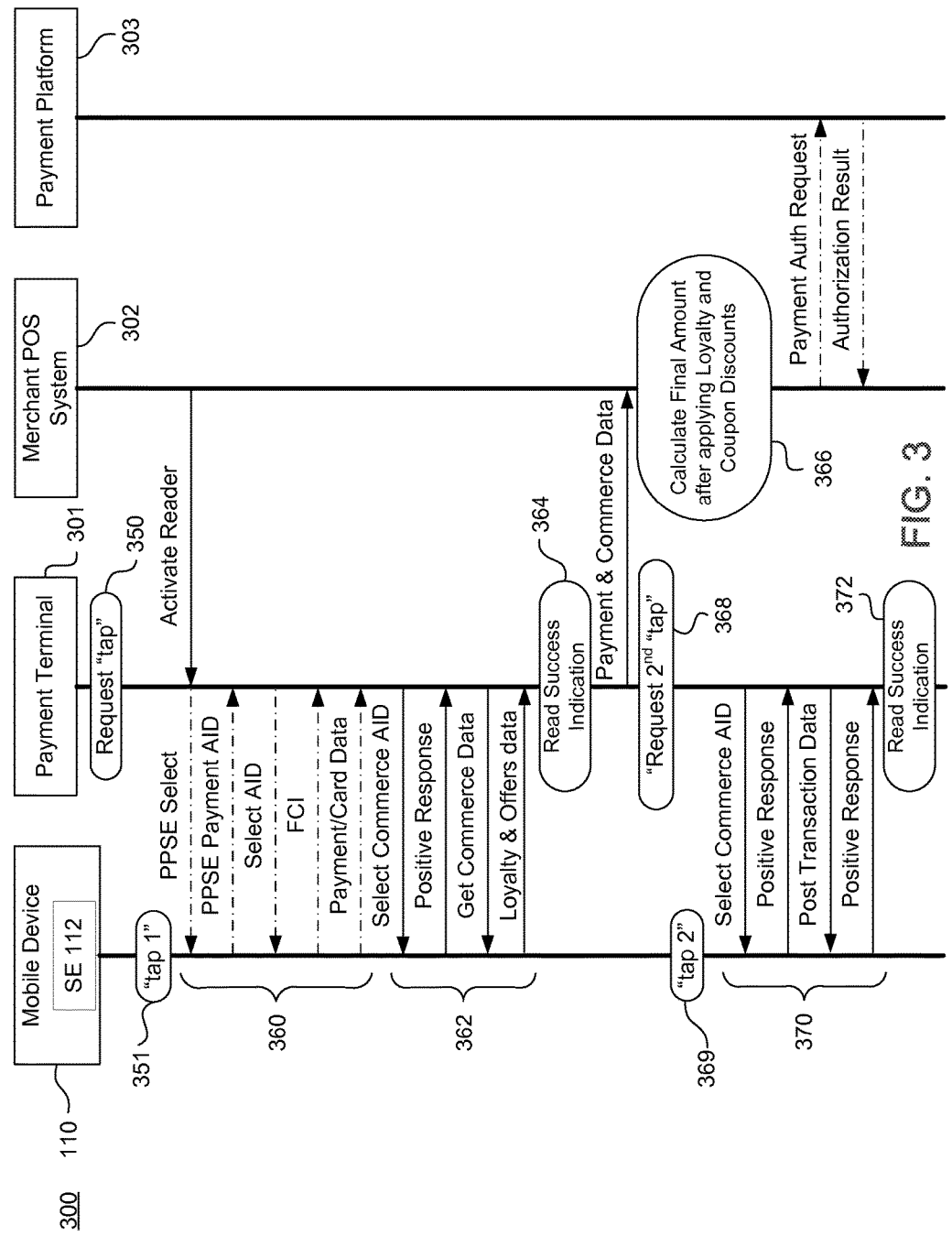
FIG. 3 shows a timing diagram illustrating a commerce process flow including a double tap and post transaction data transmission according to an exemplary embodiment.

FIG. 3 shows a timing diagram 300 illustrating a commerce process flow including a double tap and post transaction data transmission according to an exemplary embodiment. This embodiment can be used when a merchant has data to communicate back to a mobile device. For convenience, reader 120 (FIG. 1) and POS terminal 140 (FIG. 1) are illustrated as a single component and collectively referred to as payment terminal 301. Each component (i.e., reader 120 or POS terminal 140) is referred to individually when applicable. Generally, POS terminal 140 (FIG. 1) initiates a request for a second tap by sending a command, "Post Transaction Command", to reader 120. Reader 120, in turn requests a second tap from the consumer.

A merchant POS system 302 can be a merchant server operated by a merchant which controls the operation of payment terminal 301. In an exemplary embodiment, merchant POS system 302 commands payment terminal 301 to activate reader 120 ("Activate Reader") before items are being scanned, as items are being scanned, or after the items are scanned. In each case, reader 120 requests a user to place a mobile device 110 in proximity of reader 120, as shown in step 350 ("Request 'tap'"). In response to a request for the user to place a mobile device 110 in proximity of reader 120 (step 350), a consumer taps mobile device 110 onto reader 120, as shown in step 351.

Once a NFC connection has been established between mobile device 110 and reader 120, the following command exchanges are initiated for service initialization and processing of both a payment transaction and a commerce transaction. Payment transaction initialization and processing exchanges between secure element 112 and reader 120 include steps 360 and commerce transaction initialization and processing exchanges between secure element 112 and reader 120 include steps 362. Steps 360 may be performed before steps 362, afterward, or substantially simultaneously.

Referring first to steps 362, after mobile device 110 has tapped reader 120, reader 120 sends to secure element 112 a Select Commerce command along with a particular commerce AID ("Select Commerce AID") indicating which commerce applet within secure element 112 it seeks to cooperate with (e.g., commerce applet 113). In response, secure element 112 sends a positive or negative response. A negative response (not shown) results in reader 120 terminating reader application 121 (FIG. 1) and passing control to the EPM (not shown). If the response is positive ("Positive Response"), then reader 120 sends a command to the secure element 112 specifying identifying information, such as a merchant/store identifier, and any additional loyalty and offer schemes supported by that location, date and time information, the version of reader commerce application 121 supported by reader 120 and any merchant capability data ("Get Commerce Data"). Secure element 112 returns corresponding commerce elements (e.g., loyalty and offers data) to reader 120 ("Loyalty & Offers Data") based on the fields in the Get Commerce Data command received from reader 120. In one embodiment, this is accomplished by commerce applet 113, which builds a package of data (essentially a buffer or set of buffers including offers and loyalty data). In another embodiment, the buffer can be pre-built using memory space in the secure element 112.

Referring next to steps 360, in one embodiment, a PPSE Select request by reader 120 to secure element 112 causes secure element 112 to return a PPSE payment AID indicating which payment applet (and hence payment network) should be used to perform the payment transaction ("PPSE Payment AID"). In response, reader 120 sends a Select AID indicating that it supports the particular applet ("Select AID"). FCI associated with the payment applet (e.g., 117) is sent by secure element 112 to reader 120. Similarly, other payment and card information is sent by secure element 112 to reader 120 ("Payment/Card Data"). If the Select Commerce AID and PPSE Select requests are successful, as shown in step 364, payment terminal 301 forwards the commerce application data and payment credentials it has received to the merchant POS system 302 for processing ("Payment & Commerce Data"). Merchant POS system 302, in turn, records the loyalty identifier and offers (not shown) and applies any applicable discounts as product scanning continues as shown in step 366.

Once scanning has completed and a transaction amount has been approved for payment, a payment authorization request to a payment platform 303 is made ("Payment Auth Request"). In turn, payment platform 303 returns an authorization result ("Authorization Result") indicating whether or not the payment has been made.

If there is data to send back to payment terminal 301, merchant POS system creates a command, "Post Transaction Data", with correctly formatted TLVs and forwards the data to reader 120. Upon receipt of a Post Transaction command payment terminal 301 will request a second tap from the consumer, as shown in step 368 ("Request $2^{nd}$ 'tap'").

Referring to step 369 and steps 370, when the mobile device 110 is placed within proximity of reader 120 for the second time as shown in step 369, reader 120 sends a secure element 112 a Select Commerce command along with a particular commerce AID ("Select Commerce AID") indicating which commerce applet within secure element 112 it seeks to cooperate with (e.g., commerce applet 113).

If a negative response is received reader 120 terminates the reader commerce application 121. If a positive response is received, then reader 120 forwards to secure element 112 the data received in the Post Transaction Data command from the POS terminal 140 ("Post Transaction Data"). This concludes commerce processing for this transaction.

Figure 4:
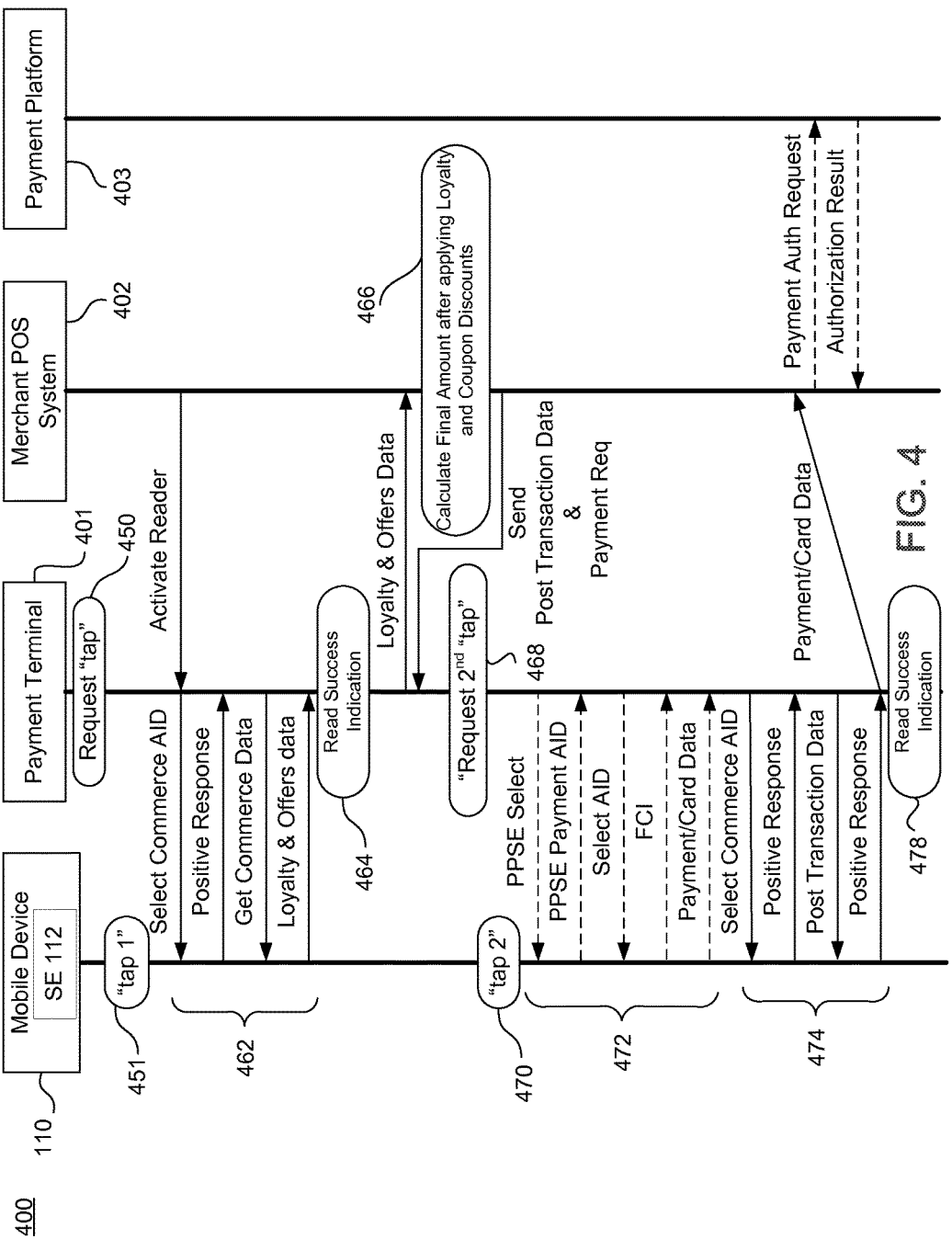
FIG. 4 shows a timing diagram illustrating a commerce process flow including a double tap, and post transaction data and payment transmissions according to an exemplary embodiment.

FIG. 4 shows a timing diagram 400 illustrating a commerce process flow including a double tap, and post transaction data and payment transmissions according to an exemplary embodiment. In this scenario the payment and post transaction data are processed after a basket has been totaled and all discounts have been applied. Usage of this flow is controlled by a reader start mode data element with a particular bit (e.g., "Payment with Post Transaction") set on.

For convenience, reader 120 (FIG. 1) and POS terminal 140 (FIG. 1) are illustrated as a single component and collectively referred to as payment terminal 401. Each component (i.e., reader 120 or POS terminal 140) is referred to individually when applicable. Generally, merchant POS system 402 initiates a request for a second tap by sending a post transaction data command to reader 120. Reader 120, in turn requests a second tap from the consumer.

A merchant POS system 402 can be a merchant server operated by a merchant which controls the operation of payment terminal 401. In an exemplary embodiment, merchant POS system 402 commands payment terminal 401 to activate the reader ("Activate Reader") before items are being scanned, as items are being scanned, or after the items are scanned. In each case, reader 120 requests a user to place a mobile device 110 in proximity of reader 120, as shown in step 450 ("Request 'tap'"). In response to a request for the user to place a mobile device 110 in proximity of reader 120 (step 450), a consumer taps mobile device 110 onto reader 120, as shown in step 451.

Once a NFC connection has been established between mobile device 110 and reader 120, the following command exchanges are initiated. The command exchanges are performed for service initialization and processing of both a payment transaction and a commerce transaction. Payment transaction initialization and processing exchanges between secure element 112 and reader 120 include steps 472, and commerce transaction initialization and processing exchanges between secure element 112 and reader 120 include steps 462 and 474.

Referring first to steps 462, after a mobile device has tapped reader 120, reader 120 sends to secure element 112 a Select Commerce command along with a particular commerce AID ("Select Commerce AID") indicating which commerce applet within secure element 112 to cooperate with (e.g., commerce applet 113). In response, secure element 112 sends a positive or negative response. A negative response (not shown) results in reader 120 terminating reader application 121 (FIG. 1) and passing control to the EPM (not shown). If the response is positive ("Positive Response"), then reader 120 sends a command to the secure element 112 specifying identifying information, such as a merchant/store identifier, and any additional loyalty and offer schemes supported by that location, date and time information, the version of reader commerce application 121 supported by reader 120 and any merchant capability data ("Get Commerce Data"). Secure element 112 returns corresponding commerce elements (e.g., loyalty and offers data) to reader 120 ("Loyalty & Offers Data") based on the fields in the Get Commerce Data command received from reader 120. In one embodiment, this is accomplished by commerce applet 113, which builds a package of data (e.g., a buffer or set of buffers including offers and loyalty data). In another embodiment, the buffer can be pre-built using memory space in the secure element 112.

At step 464, reader 120 indicates to the consumer that the transaction is complete and that the handset can be removed from payment terminal 401, which causes reader 120 to forward the commerce application data to the POS terminal 140 and, in turn, merchant POS system for processing ("Loyalty & Offers Data"). A clerk may continue to process the shopping basket.

Merchant POS system 402, records the loyalty identifier and offers (not shown) and applies any applicable discounts as product scanning continues as shown in step 466. After the basket total has been calculated, merchant POS system 402 sends a request for payment to payment terminal 401 and sends post transaction data to payment terminal 401 (if data is available to send) ("Send Post Transaction Data and Payment Req").

At step 468, payment terminal 140 requests a tap for payment. Reader 120, in turn, activates the reader field. When mobile device 110 is detected in the field of reader 120, payment processing is performed as shown in steps 472. Particularly, a PPSE Select request is made by reader 120 to secure element 112 to cause secure element 112 to return a PPSE payment AID indicating which payment applet (and hence payment network) should be used to perform the payment transaction ("PPSE Payment AID"). In response, reader 120 sends a Select AID command indicating that it supports the particular applet ("Select AID"). FCI associated with the payment applet (e.g., FIG. 1, 117) is sent by secure element 112 to reader 120. Similarly, other payment and card information is sent by secure element 112 to reader 120 ("Payment/Card Data").

Referring to steps 474, if payment terminal 401 has received post transaction data from merchant POS system 402, reader 120 starts the commerce application 121 (FIG. 1) and sends secure element 112 the Select Commerce command along with a particular commerce AID ("Select Commerce AID") after a mobile device has tapped reader 120 a second time. The Select Commerce AID identifies which commerce applet within secure element 112 should be used to cooperate with reader 120. In response, secure element 112 sends a positive or negative response. A negative response (not shown) results in reader 120 terminating reader application 121 (FIG. 1) and passing control to the EPM (not shown). If the response is positive ("Positive Response"), then reader 120 sends post transaction data to the secure element 112 ("Post Transaction Data"), with correctly formatted TLVs. This concludes commerce processing for this transaction.

If the Select Commerce AID and PPSE Select requests are successful, payment terminal 401 forwards the payment application data and payment credentials it has received to the merchant POS system 402 for processing ("Payment/Card Data"). In turn, merchant POS system sends a payment authorization request to a payment platform 403 ("Payment Auth Request"). In turn, payment platform 403 returns an authorization result (Authorization Result) indicating whether or not the payment has been authorized.

If the commerce and payment credentials and information have been successfully read, reader 120 can provide a notification either through an interface on payment terminal 140, commerce widget 115 (FIG. 1) or payment widget 119 (FIG. 1), as shown in step 478 ("Read Success Indication").

Commerce Message Specifications

Data Encoding

In one embodiment, all command/response data is encoded using BER-TLV (ISO 7816-4 Annex D) format. In some cases, the TLV (Tag, Length, Value) may be nested (embedded TLV). Due to the flexible nature of the TLV encoding format, the tagged data may be placed in any order. This is true when formatting the data for both incoming and outgoing payloads. In addition, this data is stored in record oriented tables. The order of the TLV encoded data elements stored therein is not critical; however, some data may be placed at the beginning of the record to enhance index/search performance. Thus, the record data tables provided in this document are supplied as samples for reference purposes.

A tag is encoded using a "private" tag class and a tag type representing a primitive data object encoded on one or more subsequent bytes. Therefore, the first byte (tag class) is set to 0xDF. In all cases, the data element tag is defined on a single byte. Therefore, the second tag byte has the most significant bit (b8) set to 0. This allows up to 128 valid tag values (0x00-0x7F).

Length encoding supports both the short or long forms. When the length is less that (<) 128 bytes, the most significant bit (b8) is set to 0 and the actual length is specified in the remaining bits (b7-b1). When the length is greater than (>) 128 bytes, the most significant bit (b8) is set to 1 (length mask=0x80) and the remaining bits (b7-b1) define the number of subsequent bytes in the length field. Those subsequent bytes encode an integer equal to the number of bytes in the value field.

BER-TLV Example

Assuming the incoming data uses a tag value of 0x21 (Consumer ID) with a length of 8 bytes and a value of (0x1122334455667788), the data is encoded as shown in Table 1:

TABLE 1

| Tag | Length | Value |
| --- | --- | --- |
| DF 21 | 08 | 11 22 33 44 55 66 77 88 |
| DF 21 | 81 08 | 11 22 33 44 55 66 77 88 |
| DF 21 | 82 00 08 | 11 22 33 44 55 66 77 88 |

TLV encoding allows for the length indicator to be expressed in multiple bytes. Preferably multi-byte length is supported. In short form, the length field consists of a single byte where bit 8 is set to 0 and bits 7 to 1 encode the number of bytes in the value field. One byte can thus encode any number from zero to 127. Any number from one to 127 is encoded in the same way in BER-TLV length field as in Lc and Le fields. The encoding differs for zero, 128 and more. See, for example, the coding of data objects in the Get Commerce Data command described below.

In long form, the length field consists of two or more bytes. Bit 8 of the first byte is set to 1 and bits 7 to 1 are not all equal, thus encoding the number of subsequent bytes in the length field. Those subsequent bytes encode the number of bytes in the value field. ISO/IEC 7816 does not use the "indefinite length" specified by the basic encoding rules of ASNI ISO/IEC 7816, which supports length fields of one, two, . . . up to five bytes (Table 2). In ISO/IEC 7816, the values '80' and '85' to 'FF' are invalid for the first byte of length fields.

TABLE 2

| | BER-TLV length fields in ISO/IEC 7816 | | | | |
| --- | --- | --- | --- | --- | --- |
| | 1$^{st}$ byte | 2$^{nd}$ byte | 3$^{rd}$ byte | 4$^{th}$ byte | 5$^{th}$ byte | N |
| 1 byte | '00' to '7F' | — | — | — | — | 0 to 127 |
| 2 bytes | '81' | '00' to 'FF' | — | — | — | 0 to 255 |
| 3 bytes | '82' | '0000' to 'FFFF' | — | — | 0 to 65 535 |
| 4 bytes | '83' | '000000' to 'FFFFFF' | | — | 0 to 16 777 215 |
| 5 bytes | '84' | '00000000' to 'FFFFFFFF' | | | 0 to 4 294 967 295 |

Select Commerce Applet

In one embodiment, the processing starts when reader 120 detects a mobile device 110 in the field of reader 120 and NFC communications have commenced. At that time, reader 120 sends a command to secure element 112 to select a commerce applet, particularly a "Select Commerce" command. The Select Commerce command (also referred to as a "Select Commerce Applet" command) is standardized as defined in the ISO 78016-3 specification. An example Select Commerce command structure is shown in Table 3:

TABLE 3

Select Commerce Applet

| CLA | INS | P1 | P2 | Lc | Data | Le |
|---|---|---|---|---|---|---|
| 00 | A4 | 04 | 00 | 09 | A00000048510010101 | 00 |

Secure element 112 in mobile device 110 validates the "Select Commerce" command and sends back an appropriate response. Example responses (also referred to as "Status Codes") are shown in Table 4:

TABLE 4

Status Codes

| SW1 | SW2 | Description |
|---|---|---|
| 90 | 00 | Successful execution of command |
| 67 | 00 | Wrong data length |
| 69 | 01 | Application ID not supported |
| 69 | 99 | Application not available |
| 6A | 82 | Application not installed |

All responses other than '90 00' ("Successful execution of command") cause commerce application 121 (FIG. 1) to terminate in reader 120 and pass control to the EPM.

Get Commerce Data

Upon commencement of the reader application 121 and communications between reader 120 and secure element 112 initiating, reader 120 sends a command to mobile device 110 to obtain commerce data, "Get Commerce Data." An exemplary Get Commerce Data command is defined below in Tables 5 and 6. In this example, specific loyalty and offers data is being requested. The "Merchant Capability" field is utilized by reader 120 to determine which fields need to be present in the request and response data.

Date and time stamp information are optional. In one embodiment, the date time is in synchronization with the POS. In the event that this information is not available from the POS, the date/time from the POS terminal 140 can be used. If date and time is not available, reader 120 will not send the date time stamp data element.

In an exemplary embodiment, the data elements contained in the Get Commerce Data request are preconfigured in the reader 120 or POS terminal 140 at setup time. The data may be modified after the reader 120 has been installed and configured.

TABLE 5

Get Commerce Data

| CLA | INS | P1 | P2 | Lc | Data | Le |
|---|---|---|---|---|---|---|
| 90 | 50 | 00 | 00 | xx | Merchant ID/Store ID [+ Loyalty IDs + Coupon Types + Date/Time-Stamp + Application Version + Merchant Capability] | 00 |

TABLE 6

Command Data

| Data Element | Byte Size | Value | Req |
|---|---|---|---|
| Merchant Identifier Tag | 2 | 0xDF 31 | Y |
| Identifier Length | 1 | xx | |

TABLE 6-continued

Command Data

| Data Element | Byte Size | Value | Req |
|---|---|---|---|
| Merchant Identifier | xx | [MerchantID] | |
| MerchantStore_ID Tag | 2 | 0xDF 32 | Y |
| Merchant_Store_ID Length | 1 | xx | |
| Merchant_Store_ID | xx | (StoreID/Location) | |
| Loyalty_ID Tag #1 For Secondary loyalty | 2 | 0xDF 41 | Opt |
| Identifier Length #1 | 1 | xx | |
| LoyaltyID #1 | xx | [Loyalty ID] (Hex) | |
| ... | | | |
| Loyalty_IDr Tag #X For Secondary loyalty | 2 | 0xDF 41 | Opt |
| Loyalty Identifier Length #X | 1 | xx | |
| LoyaltyID #X | xx | Loyalty ID (Hex) | |
| Date_Time_Stamp Tag | 2 | 0xDF 11 | Opt |
| Date_Time_Stamp Length | 1 | 0x07 | |
| Date_Time_Stamp | 7 | BCD (yyyymmddhhmmss) | |
| Commerce_App_Version Tag | 2 | 0xDF 12 | Y |
| Commerce_App_Version Length | 1 | 0x02 | |
| Commerce_App_Version Data | 2 | [Major + Minor] Hex | |
| Merchant_Capability Tag | 2 | 0xDF 33 | Y |
| Merchant_Capability Length | 1 | 0x02 | |
| Merchant_Capability Data | 2 | 2 Bytes Hex | |
| Terminal_Startup_Mode Tag | 2 | 0xDF 34 | Opt |
| Terminal_Startup_Mode Length | 1 | 0x02 | |
| Terminal_Startup_Mode Data | 1 | 1 Bytes Hex | |
| Total: | <var> | | |

Table 7 defines the possible Status Word values that may be returned by the Get Commerce Data command.

TABLE 7

Status Codes

| SW1 | SW2 | Description |
|---|---|---|
| 90 | 00 | Successful Execution of Command |
| 61 | xx | More data to follow |
| 67 | 00 | Wrong Data Length |
| 69 | 09 | Internal Error |

Any response other than '61 xx' or '90 00' will result in reader 120 terminating commerce application 121 and passing control to the EPM, after recording the error and storing the data for forwarding to commerce widget 115.

If the Get Commerce Data request is correctly formatted, commerce applet 113 on secure element 112 filters the data based on the merchant identifier ("Merchant_ID"), loyalty identifier ("Loyalty_ID") and offer type code ("Offer_Type_Code") to format a response data for reader 120 based on the version number in the request. Commerce applet 113 may return more than one Loyalty ID and multiple Offers messages based on the configuration in the wallet. Table 8 lists exemplary response data:

TABLE 8

Example Response Data

| Data Element | Byte Size | Value |
|---|---|---|
| Consumer_ID Tag | 2 | 0XDF21 |
| Consumer_ID Length | 1 | 0x10 |
| Consumer_ID Data | 16 | [Consumer ID] |
| Loyalty_ID Tag #1 | 2 | 0xDF41 |
| Loyalty_ID Length #1 | 1 | xx |
| Loyalty Identifier #1 | xx | [Loyalty ID] |

TABLE 8-continued

Example Response Data

| Data Element | Byte Size | Value |
|---|---|---|
| Loyalty_Account_Code Tag #1 | 2 | 0xDF43 |
| Loyalty_Account_Code Length #1 | 1 | xx |
| Loyalty_Account_Code #1 | xx | [Acct Code] |
| Loyalty_ID Tag #2 | 2 | 0xDF 41 |
| Loyalty_ID Length #2 | 1 | xx |
| Loyalty_ID Data #2 | xx | [Loyalty ID] |
| Loyalty_Account_Code Tag #2 | 2 | 0xDF43 |
| Loyalty_Account_Code Length #2 | 1 | xx |
| Loyalty_Account_Code Code #2 | xx | [Acct Code] |
| ... | | |
| Offer_ID Tag #1 | 2 | 0xDF51 |
| Offer_ID #1 ID Length | 2 | X'81 xx' |
| Offer_ID #1 ID Value | xx | [Coupon ID] |
| Offer_Code #1 Code Tag | 2 | 0xDF53 |
| Offer_Code #1 Code Length | 2 | 0x'81xx' |
| Offer_Code #1 Code Value | xx | [Coupon Code] |
| Offer_ID Tag #2 | 2 | 0xDF51 |
| Offer_ID #2 ID Length | 2 | 0x'81xx' |
| Offer_ID #2 ID Value | xx | [Coupon ID] |
| Offer_Code #2 Code Tag | 2 | 0xDF53 |
| Offer_Code #2 Code Length | 2 | 0x'81xx' |
| Offer_Code #2 Code Value | xx | [Coupon Code] |
| ... | | |
| Total: | <var> | |

The following is an exemplary response data parsing sample. The NFC reader (or POS terminal) delivers this commerce data to a POS system in a string of data that may contain consumer, loyalty and/or offer data. The merchant POS system can then parse the data to obtain the loyalty and offer data, and process the data per the merchant's specifications.

```
DF 21 10 00 11 22 33 44 55 66 77 88 99 AA BB CC DD EE FF DF 41 06
18 DB 6E 23 F4 0B DF 43 0D 02 31 38 44 42 36 45 32 33 46 34 30 42
DF 51 08 88 77 66 55 44 33 22 05 DF 53 09 02 42 41 31 38 37 36 35
34 DF 51 08 88 77 66 55 44 33 22 06 DF 53 0C 02 41 39 39 39 39 31
33 33 35 37 38 DF 51 08 88 77 66 55 44 33 22 07 DF 53 10 02 5A 58
31 37 39 35 36 37 35 34 38 33 31 43 46 DF 51 08 88 77 66 55 44 33
22 08 DF 53 0C 02 31 38 30 30 38 37 32 30 30 31 DF 51 08 88 77
66 55 44 33 22 09 DF 53 33 02 57 4B 52 50 31 32 33 34 35 36 37 38
39 41 42 43 44 45 46 47 48 49 4A 4B 4C 4D 4E 4F 50 50 57 50 57 50
57 50 57 50 57 50 57 50 57 50 57 50 57 50 57 50 40 A1
Data parsing example
DF 21 10 00 11 22 33 44 55 66 77 88 99 AA BB CC DD EE FF
(Consumer ID)
DF 41 06 18 DB 6E 23 F4 0B          (MoCom Loyalty ID)
DF 43 0D 02 31 38 44 42 36 45 32 33 46 34 30 42
(Consumer Loyalty Code)
DF 51 08 88 77 66 55 44 33 22 05    (MoCom Offer ID) #1
DF 53 09 02 42 41 31 38 37 36 35 34 (Merchant Offer Code) #1
DF 51 08 88 77 66 55 44 33 22
```

TABLE 9

Post Transaction Data Command

| CLA | INS | P1 | P2 | Lc | Data | Le |
|---|---|---|---|---|---|---|
| 90 | 52 | 00 | 00 | xx | <TLV Encoded Post Transaction Data> | 00 |

TABLE 10

Command Data

| Data Element | Byte Size | Value | Req |
|---|---|---|---|
| Transaction ID | 2 | 0x DF 61 | Opt |
| Transaction ID Length | 1 | xx | |
| Transaction ID Data | xx | Merchant generated Transaction ID | |
| Offer_ID Code #1 | 2 | 0XDF 51 | Opt |
| Offer_ID Length #1 | 1 | xx | |
| Offer_ID Data #1 | xx | Coupon ID | |
| ... | | | |
| Offer_ID Code #X | 2 | 0XDF 51 | Opt |
| Offer_ID Length #X | 1 | xx | |
| Offer_ID Data #X | xx | Coupon ID | |
| Total: | <var> | | |

Multi-Block Data Handling

Figure 5:
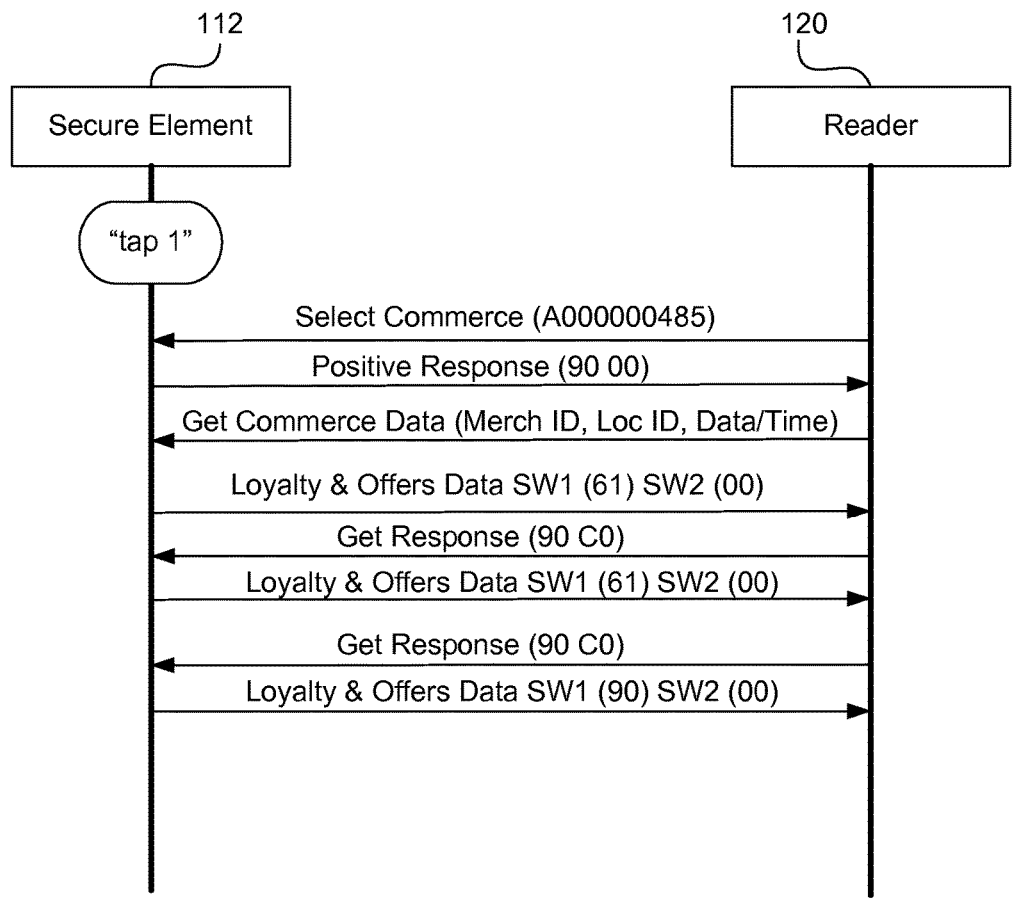
FIG. 5 illustrates an exemplary multi-block data flow according to an example embodiment.

FIG. 5 illustrates an exemplary multi-block data flow according to an example embodiment. When secure element 112 has more than 255 bytes of data to send, a Get Response command (CO) is used to retrieve the remaining response data. Particularly, this command is used to obtain the remaining data when the commerce applet 113 must send more than, for example, 255 bytes of response data.

Post Transaction Data

As explained above, a Post Transaction Data command provides a mechanism to receive data back from a merchant POS system (MPOS). This command is initiated by the merchant POS terminal 140 and preferably is supported in the merchant capability field. In an exemplary embodiment, this command consists of a single frame of data with a maximum data size of 255 bytes. The contents of the data use standard TLV formatting but may also be variable. This command enables dynamic reconciliation or post transaction data consolidation. Additional data tags may be defined for the transmission of additional data from the POS terminal/MPOS to the secure element 112 in mobile device 110. An exemplary post transaction data command ("Post Transaction Data") is illustrated in tables 9 and 10:

Referring to FIG. 5, after a user taps a commerce-enabled mobile device 110 to reader 120, reader 120 sends a Select Commerce command to the secure element 112 of the mobile device 110. A positive response ('90 00') causes reader 120 to send a Get Commerce Data command. In response, secure element 112 returns loyalty and offers data. As shown in FIG. 5, the Get Commerce Data response status SW1 flag is set to '61' and the SW2 flag is set to '00'.

A Get Response command is triggered when the SW1 flag in the Get Commerce Data response is set to '61'. In this example, the SW2 flag is set to '00' because commerce applet 113 on mobile device 110 may not know how much data is left to send. The subsequent response to the Get Response command also contains an SW1 flag set to '61', causing a second Get Response command to be sent by reader 120 to mobile device 110.

This sequence will terminate when the SW1 flag of the Get Commerce Data response is set to any value other than '61'. For example, an SW1 value of '90' in response to a Get Response command as shown in FIG. 5 will indicate normal completion. Any other SW1 value can be logged as an error.

Table 11 defines exemplary settings for the Get Response Data APDU command:

TABLE 11

| | | | Get Response Data | | | |
|---|---|---|---|---|---|---|
| CLA | INS | P1 | P2 | Lc | Data | Le |
| 90 | C0 | 00 | 00 | 00 | <none> | 00 |

The actual length of the remaining data is variable. Therefore, the Le data length can be 0x00; allowing the commerce applet 113 to manage a variable length response.

Table 12 defines possible status word values ("Status Codes") that may be returned by the Get Response Data APDU command.

TABLE 12

| | | Status Codes |
|---|---|---|
| SW1 | SW2 | Description |
| 90 | 00 | Successful execution of command |
| 61 | xx | More data to follow |
| 67 | 00 | Wrong data length |
| 69 | 09 | Internal error |

Reader Configuration Data

In one embodiment, during the installation and configuration of reader 120 certain merchant and commerce specific data are loaded and saved in reader 120. This data is used by reader 120 to fill in the Get Commerce Data command from reader 120. These data elements can be updated as new features and functions become available.

Commerce AID

As explained above, a commerce AID is sent in the Select Commerce command. If the command is accepted by mobile device 110, commerce applet 113 is started and APDU command/response flows will start between reader 120 and secure element 112. In an exemplary embodiment, the commerce AID value is A00000048510010101. This value can be hardcoded on reader 120. In one embodiment, reader 120 is not required to support partial selection.

Merchant_ID

A merchant identifier (Merchant_ID (DF31)) can be loaded onto reader 120. Merchant ID is a value assigned by a service provider. In one embodiment, this value is assigned by the MoCom platform operator. This is required to allow commerce applet 113 to filter the loyalty and coupon data, and send the appropriate items to the reader 120.

Merchant_Store_ID

A merchant store identifier value (Merchant_store_ID (DF32)) is loaded to the reader 120 and is a value assigned by a service provider. This value can be used, for example, for reporting purposes.

Loyalty_ID

A loyalty identifier value (Loyalty_ID (DF41)) is used when multiple Loyalty IDs are being requested during a tap. This is accomplished by setting the Secondary Loyalty in Merchant Capabilities (DF33). This allows commerce applet 113 to return additional loyalty numbers in the response to a Get Commerce Data command. Multiple (e.g., 5) additional Loyalty_IDs may be coded in the Get Commerce Data request.

Offer_Type_Codes

Offer type codes (Offer Type Codes (DF54)) are loaded onto reader 120. Values assigned to Offer Type Codes are assigned by a service provider. This value is used by the commerce applet 113 to filter offers and send only the appropriate items to reader 120. Multiple Offer_Type_Codes can be defined and sent to the secure element 112 in the Get Commerce Data command.

Commerce_Application_Version

A commerce application version number (Commerce_Application_Version) can be loaded onto reader 120 to represent the version of the commerce reader specification that the application on reader 120 is coded to and certified for.

Merchant_Capabilities

The Merchant Capabilities value represents the Commerce features supported by a particular merchant. This data element can also be used by reader 120 to format the Get Commerce Data command.

Terminal_Startup_Mode

A terminal start mode command (Terminal Start Mode (DF34)) commands reader 120 to provide the mechanism used to start commerce application 121. This data element is not sent to the secure element 112. This data element will also be used to define processing flows between reader 120 and secure element 112 on the handset.

Get Commerce Data Fields

Table 13 provides an exemplary definition of data required by reader 120 to format the Select Commerce and Get Commerce Services commands:

TABLE 13

| Data Element | Tag | Max Size Bytes | Data Format |
|---|---|---|---|
| Commerce AID | | 09 | Hex |
| Merchant ID | DF 31 | 8 | Hex |
| Merchant Store ID | DF 32 | 32 | ASCCI |
| Loyalty Identifier #1 thru X | DF 41 | 8 | BCD |
| Date and Time Stamp | DF 11 | 7 | BCD |
| Specification Version (Major/Minor) | DF 12 | 2 | Hex |
| Merchant Capabilities | DF 33 | 2 | Binary |
| Commerce Start Mode | DF 34 | 2 | Binary |

Commerce Applet Version Format

A Commerce Applet Version value is a two-byte hex field the first byte containing the major version (xx) and the second byte contains the minor version (xx). These fields are updated in accordance to the specific version of the reader commerce technical specification that is implemented on reader 120. In an exemplary embodiment, the first official release of the commerce application 121 is 0x0100.

Merchant Capabilities

A merchant capabilities field (Merchant Capabilities Field (DF 33)) determines which commerce functions are being implemented by the merchant. Reader 120 can pass this field to mobile device 110, and mobile device 110 uses the information to build a response frame, referred to as Commerce Data Response frame. Table 14 illustrates exemplary merchant capabilities:

TABLE 14

Merchant Capability Data
Commerce Start Mode Format

| Byte | Bit | Value | NFC reader function |
|---|---|---|---|
| 1 | 8 MSB | 1 = Merchant Loyalty Support<br>0 = No | If Bit 8 is on the reader will send the required Merchant ID and optionally a Loyalty ID for the merchant |
| 1 | 7 | 1 = Secondary Loyalty<br>0 = No | Bit 8 must be on. Additional Loyalty ID's is included in the Get Commerce Data request |
| 1 | 6 | 1 = Offers Support<br>0 = No | Offer Type fields is included in Get Commerce Data request |
| 1 | 5 | 1 = Additional Offer support<br>0 = No | The merchant can request additional offers in the Get Commerce request |
| 1 | 4 | 1 = Contactless Payment support<br>0 = No | Some merchants may choose to only accept Commerce but not contactless payments. This bit setting is information only. It will not stop the PPSE process from happening. |
| 1 | 3 | 1 = Enterprise Merch ID<br>0 = No | |
| 1 | 2 | 1 = Cloud Based Offer<br>0 = No | Indicates that the merchant can support cloud based offers (Future) |
| 1 | 2 | 0 | Reserved for Future Use |
| 1 | 1 | 1 = Post Transaction Data support<br>0 = No | The reader will receive redemption data from the POS and forward it to the handset |
| 2 | 8-1 | 0 | Reserved for Future Use |

Commerce Start Mode Format

A commerce start mode format value (Commerce Start Mode (DF34)) indicates to reader 120 what mechanism is to be used to start commerce application 121 on reader 120. In one embodiment, this data element is not sent to the mobile device 110 in the Get Commerce Data command. In another embodiment, this data element is optional. Table 15 illustrates exemplary start modes can be used to commence commerce application 121. In an exemplary embodiment, bits 7 and 8 are exclusive and only one bit is turned on at a time:

TABLE 15

Commerce Start Mode

| Byte | Bit | Value | Reader function |
|---|---|---|---|
| 1 | 8 MSB | 1 = Auto Start<br>0 = No | At the start of the check the reader will quest Commerce AID at the first TAP |
| 1 | 7 | 1 = Manual Start<br>0 = No | The reader will only select Commerce AID after some user intervention. |
| 1 | 6 | 1 = Payment with Post Transaction Data<br>0 = No | Payment and Post Transaction Data will occur on TAP 2 |
| 1 | 5 | Payment First | Payment PPSE will precede in Auto or Manual start modes |
| 1 | 4-1 | 0 | Reserved for Future Use |
| 2 | 8-1 | 0 | Reserved for Future Use |

Reader Message Forwarding

While reading commerce application data from the mobile device 110, reader 120 forwards the data to a merchant POS system or POS application resident on a POS terminal 140. Reader 120 strips off the APDU headers and un-blocks the data from the mobile device 110. The Tagged TLV frames are then wrapped in the appropriate protocol and forwarded to the merchant POS system or POS application running on the POS terminal for processing.

Commerce Response Data Description

During a successful interaction with a reader 120, data will be returned to the POS merchant system (or POS terminal). This information will typically be composed of a consumer loyalty number and/or some number of offers that the merchant defined and loaded to the consumer's wallet.

Consumer ID

A consumer identifier (Consumer ID) is a unique identifier that is assigned to a consumer during the wallet activation process. Typically, Consumer ID will stay with a consumer even if the consumer moves her wallet to a new mobile device or different mobile network. In a preferred embodiment, Consumer ID is sent from the mobile device to the reader on every commerce-related interaction, even if the handset has no loyalty or offers data to send. The presentation of Consumer ID can be used by the merchant POS system to trigger specific actions related to a payment-only tap.

Loyalty ID

A loyalty identifier (Loyalty ID) is sent along with each consumer loyalty number requested during a tap event. Loyalty ID is a unique value assigned to each merchant loyalty program assigned by the MoCom platform. In most cases the Loyalty ID received by the reader will match the Merchant ID that was configured by the Get Commerce data command. Use of this information by a merchant system is optional.

Consumer Loyalty Code

A consumer loyalty code (Consumer Loyalty Code) matches the loyalty number assigned to the consumer for a specific merchant loyalty program. Wallet application 114 allows for multiple loyalty numbers to be presented at the tap. If the system is set up for multiple consumer loyalty codes, each consumer loyalty code will be preceded by its unique loyalty ID.

Offer ID

A mobile commerce offer identifier (Offer ID) is sent along with each consumer offer number sent during a commerce-related session. The Offer ID is a unique value assigned to each offer delivered to a consumer wallet. In one embodiment, no two Offer IDs generated by the MoCom platform will have the same value.

Merchant Offer Code

A merchant offer code ("Merchant Offer Code" or "Offer Number") is generated by the merchant and loaded to the consumer's wallet application through various means. This number matches the same offer that is defined on the merchant POS system for processing. There can be multiple merchant offers (e.g., 10) presented during a single commerce transaction. The merchant system parses the incoming data to extract the individual merchant offers.

Commerce Response Data Fields

Table 16 defines exemplary data elements that may be returned to the merchant POS system after a successful commerce transaction:

TABLE 16

| Data Element | Tag | Max Size Bytes | Data Format |
|---|---|---|---|
| Consumer ID | DF 21 | 16 | BCD |
| Loyalty ID | DF 41 | 8 | Hex |
| Consumer Loyalty Code | DF 43 | 32 | ASCII, Hex, BCD |
| Offer ID | DF 51 | 8 | BCD |
| Merchant Offer Code | DF 53 | 48 | ASCII, Hex, BCD |

In one embodiment, a data element "Terminal Start Mode" is passed to reader 120 but will not be passed to the secure element 112. Reader 120 uses this information to control when Select Commerce and Select PPSE commands are sent to the secure element 112.

Reader Commerce Application Functionality

The following section provides a list of functions that the Commerce application within reader 120 performs. Some of these functions are automated, while others are triggered via an API call from the POS terminal or merchant POS.

Select Commerce AID Command

After the Commerce application is started on reader 120 and a device is detected in the field of reader 120, the first command sent is Select Commerce AID. The command will contain the RID value assigned by ISO and a PIX value generated by a commerce service provider. The Commerce AID value is A00000048510010101. This value should be hard coded on reader 120.

Get Commerce Data Command

The Get Commerce Services Data command is a general data request to the secure element 112. The Get Commerce Data has a number of required and optional fields that communicate information to commerce applet 113. Commerce applet 113 uses this information to build the data elements that need to be sent to reader 120. Reader 120 uses the fields in the Merchant Capability records to determine which optional fields need to be included in the request to the handset.

Post Transaction Data

The Post Transaction Data command was created to provide a mechanism to receive data back from the MPOS. This command consists of a single frame of data with a maximum data size of 255 bytes. The contents of the data use standard TLV formatting, but the contents may be variable. Additional data tags may be defined for the transmission of additional data from the POS Terminal/MPOS to secure element 112 in mobile device 110.

NFC Error Recovery

In a preferred embodiment, reader 120 is able to recover from a reader error generated when the handset is prematurely removed from the NFC field. Reader 120 signals the read error to the consumer via a failure interface such as a speaker that outputs a "beep" or display that provides an optical indication such as via lights. The consumer is asked to tap again and the transaction that was in progress during the error is restarted. In the case where multiple transactions are being processed, such as a commerce transaction and a PPSE transaction, reader 120 will try to recover the last process being executed.

Large Data Block Support

In an exemplary embodiment, reader 120 reads and writes multiple 255-byte blocks of data to and from mobile device 112 in a single tap process.

Date and Time Stamp Support

When reader 120 has connectivity to the merchant POS system, the date and time can be retrieved from the POS terminal at the start of the transaction.

TLV Master Tag List

Table 17 defines the data elements and corresponding tag values and target/max byte sizes used by commerce based applications. Additional values have been provided for those elements with a limited/fixed value range.

TABLE 17

| Data Element | Tag | Max Size | Description |
|---|---|---|---|
| APDU Commands | | | |
| Commerce Services Shared Data Elements | | | |
| DATE_TIME_STAMP | 0xDF11 | 7 | Date/Time stamp (yyyymmddhhmmss) |
| COMMERCE_APP_VERSION | 0xDF12 | 2 | Supported Commerce application Version Number |
| Consumer Data Elements | | | |
| CONSUMER_ID | 0XDF21 | 16 | MoCom Platform specific consumer identifier |
| CONSUMER_KEY | 0xDF22 | 16 | MoCom Platform generated consumer specific 3DES key |

TABLE 17-continued

| APDU Commands | | | |
|---|---|---|---|
| CONSUMER_CERT | 0xDF23 | 8 | MoCom Platform generated consumer signature/certificate |
| Merchant Data Elements | | | |
| MERCHANT_ID | 0xDF31 | 8 | MoCom Platform specific merchant identifier |
| MERCHANT_STORE_ID | 0xDF32 | 32 | MoCom Platform specific merchant store identifier ASCII character data |
| MERCHANT_CAPABILITY | 0xDF33 | 2 | Supported Commerce application Services |
| NFC READER_START_MODE | 0xDF34 | 2 | NFC enabled payment terminal startup mode (provided by Merchant POS System during initialization) |

| Data Element | Value | Max Size | Description |
|---|---|---|---|
| Merchant Capabilities | | | |
| MERCAP_MERCHANT_LOYALTY | 0x80 | 1 | The Get Commerce Data request includes a valid merchant identifier used to determine the Loyalty data received by the applet. |
| MERCAP_ADDITIONAL_LOYALTY | 0x40 | 1 | The Get Commerce Data request includes additional Loyalty Identifiers. Additional Loyalty data is determined by the specified Loyalty ID(s). |
| MERCAP_MERCHANT_OFFERS | 0x20 | 1 | Offer type fields are included in Get Commerce Data request |
| MERCAP_ADDITIONAL_OFFERS | 0x10 | 1 | The Get Commerce Data request includes a valid merchant identifier used to determine the offers data received by the applet. |
| MERCAP_PAYMENT | 0x08 | 1 | Indicates merchant supports contactless payment. |
| MERCAP_ENTERPRISE | 0x04 | 1 | Indicates support for Enterprise Merchant ID |
| MERCAP_CLOUD | 0x02 | 1 | Indicates support for cloud based offers and Loyalty |
| MERCAP_REDEMPTION | 0x01 | 1 | The NFC reader supports the transmission of offer redemption data (from the POS) to the applet via the Redeem Offer command. |
| Service Provider Platform Data Elements | | | |
| PLATFORM_SIGNATURE | 0x71 | 8 | MoCom Platform generated MAC/Signature appended to command/data originating from the platform for remote verification purposes (data integrity/authenticity). |
| PLATFORM_KEY | 0x72 | 16 | MoCom Platform Key |
| PLATFORM_CERT | 0x73 | 8 | MoCom Platform Certificate |

| Data Element | Tag | Max Size | Description |
|---|---|---|---|
| Loyalty | | | |
| Loyalty Data Elements | | | |
| EMBEDDED_TLV_LOYALTY_DATA | 0xDF40 | xx | Embedded TLV loyalty data tag |
| LOYALTY_ID | 0xDF41 | 8 | MoCom Platform specific loyalty identifier |
| LOYALTY_STATUS | 0xDF42 | 1 | Loyalty card/account status (see below) |
| LOYALTY_ACCOUNT_CODE | 0xDF43 | 32 | Loyalty account (barcode data) |

TABLE 17-continued

| APDU Commands | | | |
|---|---|---|---|
| LOYALTY_MAC_SIGNATURE | 0xDF44 | 8 | MoCom Platform specific MAC/Signature for integrity/authenticity verification |
| Transaction Log Transaction Data Elements | | | |
| EMBEDDED_TLV_TRANSACTION_LOG | 0xDF60 | xx | Transaction log record data tag |
| TRANSACTION_ID | 0xDF61 | 16 | Transaction ID (assigned by POS) |
| TRANSACTION_STATUS | 0xDF62 | 3 | Transaction log record data tag |
| Offers Offer Data Elements | | | |
| EMBEDDED_TLV_OFFER_DATA | 0xDF50 | xx | Embedded TLV offer data tag |
| OFFER_ID | 0xDF51 | 8 | MoCom Platform specific offer identifier |
| OFFER_STATUS | 0xDF52 | 1 | Offer status (see below) |
| OFFER_CODE | 0xDF53 | 130 | Offer (UPC/EPC/GS1 Databar) barcode data |
| OFFER_TYPE_CODE | 0xDF54 | 9 | Offer Type (see below) |
| OFFER_MAC_SIGNATURE | 0xDF55 | 8 | MoCom Platform specific data security signature |
| OFFER_UPDATE_FLAG | 0xDF56 | 1 | Update flag (synchronization status) |

Table 18 provides a master list of exemplary APDU commands supported by the Commerce Applet 113.

TABLE 18

| Command | CLA | INS | P1 | P2 | Lc | Data | Le |
|---|---|---|---|---|---|---|---|
| Get Commerce Data | 90 | 50 | 00 | 00 | xx | Date/Time Stamp + Merchant ID + Store ID [+Commerce application Version + Merchant Capabilities + Transaction ID + Loyalty IDs + Offer Codes] | 00 |
| Post Transaction Data | 90 | 52 | 00 | 00 | xx | <TLV-Encoded Transaction Data> | 00 |
| Get Remaining Data | 90 | C0 | 00 | 00 | xx | None | 00 |

Specially Formatted Data Elements

Data elements included in the commerce data payload may include a format byte that identifies the data encoding used for that element. The data encoding is specified by the merchant to ensure compatibility at the point of sale. The formatted data value is supplied by the commerce platform to the wallet application 114. Thus, no additional interpreting/formatting is necessary between the platform 130, wallet 114, secure element 112, and reader 120/POS terminal 140 (collectively referred to as "payment terminal"). It is the role of the payment terminal (or merchant POS system) to properly interpret the data and supply it to the merchant system for processing.

In an exemplary embodiment, the following data elements include the following format value:

Loyalty Account Code (DF 43)

Offer Code (DF 53)

Table 19 defines possible format byte values and their corresponding encoding rule:

TABLE 19

| Format Byte | Encoding Rule | Description |
|---|---|---|
| 0x00 | Hexadecimal | Each byte of data is encoded in (raw) hexadecimal format. |
| 0x01 | Binary Coded Decimal (BCD) | Each nibble represents a single digit. Thus, only decimal values are specified. A data stream containing an odd number (length) of digits includes the hex value 'F' in the first nibble of the data stream. |
| 0x02 | ASCII | Each byte represents an ACII value that is interpreted as such and handled as its corresponding CHAR value. In most cases, these data streams are converted into a String before being passed to the merchant POS system for processing. |

A BCD encoded data value that includes the hexadecimal value 'F' in the first nibble shall identify a data stream containing an odd number of digits. Thus, the BCD data stream 12345 is encoded in 3 byte buffer as follows: 0xF12345.

Exemplary Implementations

Figure 6:
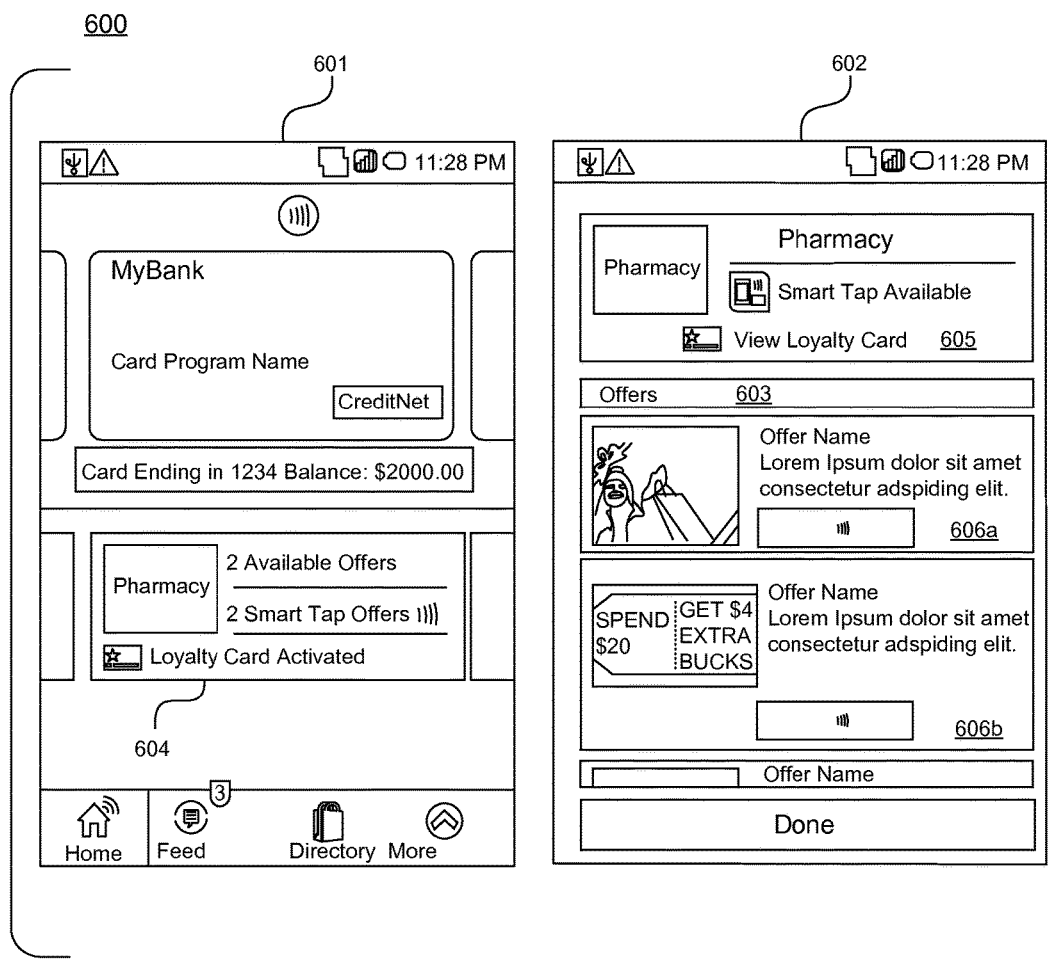
FIG. 6 illustrates windows or screen shots generated by the graphical user interface for a wallet application in accordance with an example embodiment of the present invention.

FIG. 6 illustrates windows or screen shots generated by the graphical user interface for a wallet application in accordance with an example embodiment of the present invention. For purposes of this exemplary implementation, the mobile device 110 has some redeemable offers and loyalty cards stored in memory 111*b*.

The wallet home screen 601 features a strip of merchant tiles 604. A tile is present for every merchant that has a redeemable object (e.g., a redeemable offer or loyalty card) present in the mobile wallet. The user may, for example, swipe through the tiles, left and right, to find a particular merchant. Once the particular merchant is found, the tile is selected to open a merchant offer view 602. This can be done prior to making a transaction or immediately prior to making the transaction, such as while waiting in line, or earlier (e.g., while browsing through a store.).

The merchant offer view 602 presents a list of redeemable offers 603 available in the wallet. Non-redeemable promotions may be presented as well. If present, a loyalty card 605 is also presented and made accessible from the merchant offer view 602.

If the selected merchant is not a commerce-enabled merchant, there is no option presented to load offers for a commerce transaction. If the merchant is a commerce-enabled merchant, however, one or more buttons or icons 606a, 606b are presented allowing offers to be loaded for a commerce transaction.

The user may select an offer (e.g., 606a), and then select the "Done" bar at the bottom of the screen.

In an exemplary embodiment, a limit as to the number of offers can be enforced by secure element 112 (e.g., 10 offers), and the user interface of commerce widget 115 enforces this limit while the user is activating offers. The "Done" bar is the trigger to load the selected offers into secure element 112. If there are offers from another merchant in the secure element 112, they can be removed at the same time as the new offers are loaded—this ensures that there are only offers from one merchant present in the 112 at any given time.

When the secure element load is complete, the user taps the mobile device 110 to reader 120. What happens next depends on a few factors. If the reader that is tapped is not capable of processing commerce elements, the selected payment card is sent, but no commerce elements (e.g., offers or loyalty credentials) are sent. A post-tap message is presented through the reader interface indicating that payment credentials were sent, with no other information.

If the reader that is tapped is capable of processing commerce elements, but the merchant-ID does not match the selected merchant, offers will not be sent. Commerce applet 113 in secure element 112 can search for a loyalty card for this merchant-ID and transmit loyalty credentials, if present. A post-tap message is presented through an interface indicating that an event took place, identifying the merchant and reporting that loyalty credentials were sent (if they were available) as well as the payment credentials.

If the reader that is tapped is a commerce-enabled reader and the merchant-ID matches the selected merchant, selected offers and (if present) the loyalty card credentials for the merchant are sent. Mobile device 110 can present a post-tap message through the commerce widget 115 user interface confirming that offers and loyalty (if present) were sent, along with payments.

Following the tap, offers that were loaded into the secure element 112 are left in secure element 112 until the user removes them or selects offers from another merchant. Alternatively, if the offers expire, it is removed from the secure element 112 when wallet maintenance is performed. In an exemplary embodiment, the selected merchant will remain the "active" merchant on the wallet home page until the user selects a different merchant.

Instant Offer Implementation

Figure 7:
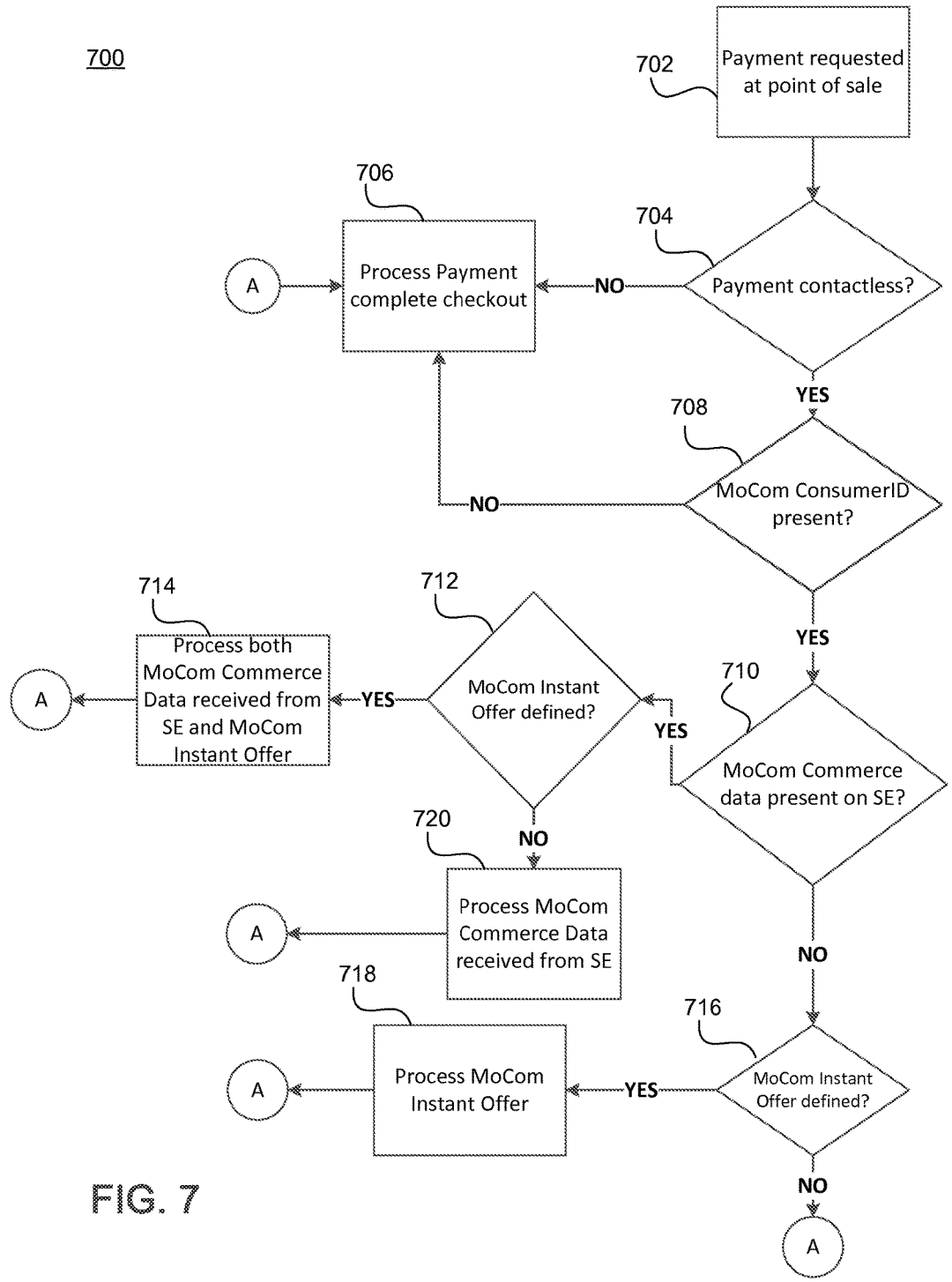
FIG. 7 illustrates a flow diagram illustrating an exemplary instant offer implementation according to an embodiment of the present invention.

FIG. 7 illustrates a flow diagram illustrating an exemplary instant offer implementation according to an embodiment of the present invention. In this embodiment, a mobile commerce (MoCom) platform can be integrated with merchant POS system to implement a mechanism for users to select offers by using a wallet application and/or instant offers merchants make available to consumers.

A wallet application running on a mobile device can be used to allow consumers to pay for purchases and present loyalty and offers via a payment terminal. One way a consumer can redeem an offer is by selecting the offer via the wallet application to be presented at checkout.

Consumers can also be provided with offers that can be instantly redeemed through the wallet application. Such offers are referred to herein as "instant offers". This feature allows merchants to reward consumers who use a mobile device running the wallet application to make purchases. Consumers benefit from the instant offer because, among other reasons, they do not need to specifically select an offer via the wallet application. Depending on the implementation, an instant offer can be used along with an offer explicitly selected by the consumer from the wallet application. Whether an offer is selected by the consumer or provided "instantly," a consumer identifier ("Consumer ID") value retrieved from the mobile device (e.g., from secure element 112) is used as the key for retrieving and redeeming an instant offer.

Referring to FIG. 7, in one embodiment, a consumer selects offers from the wallet application to be presented at the checkout. At block 702, a payment is requested at a POS. If at block 704, it is determined that the payment is not a contactless payment, then at block 706 the payment process is completed via alternative means (e.g., by using cash) and the checkout process is completed. If it is determined at block 704 that the payment will be a contactless payment, then the mobile device user is asked to tap his or her mobile device to the reader (e.g., reader 120 described above).

In response, the mobile device is tapped to the reader. During the tap event, a number of data elements can be passed between the reader and a secure element on the mobile device as described above. In one embodiment, the payment card data, Consumer ID, loyalty number, and offer codes are passed to the reader during the tap of the reader. In this embodiment, Consumer ID is sent to the reader even if the tap is for a payment only transaction with no offers selected.

If at block 708 it is determined that a MoCom Consumer ID is not present, then at block 706 the payment process is completed and the checkout process is completed by processing the payment.

If it is determined at block 708 that a MoCom Consumer ID is present, then at block 710 a determination is made as to whether a MoCom offer is present (e.g., an offer selected by the user via a wallet application). If at block 710 a determination is made that a MoCom offer is present, then a determination is made at block 712 as to whether a MoCom instant offer has been defined as well. If at block 712 it is determined that a MoCom instant offer has been defined, both the MoCom offer (i.e., an offer selected by a user via a wallet application interface) and MoCom instant offer are processed, as shown in block 714. Once the MoCom offer and/or MoCom instant offer are processed, the payment associated with those offers is processed as shown at step 706.

If at block 710 a determination is made that a MoCom Offer is not present, then at block 716 a determination is made as to whether a MoCom instant offer has been defined. If not, the payment is completed as shown at step 706. If a determination is made at block 716 that the MoCom instant offer is present, the MoCom instant offer is processed as shown at block 718 and the payment associated with the MoCom instant offer processed as shown at block 706.

If a determination is made at block 712 that a MoCom instant offer has not been defined, then a standard MoCom offer is processed, as shown at block 720 and at block 706 the payment processed is completed.

The merchant POS system can use the presence of the ConsumerID to trigger the use of an instant offer. The offer could be, for example, a cents off or percentage off type offer that a merchant using the MoCom system defines. This can be, for example, applied for the purchase of a specific item. In an exemplary implementation, the merchant is provided an option of turning instant offer functionality off or on when a wallet offer is presented during the tap.

The instant offer can be defined by a merchant and then distributed to its retail locations. The offer can also have an associated specific start and end date. The ability to distribute instant offers to different geographical areas can be taken into account as well.

Commerce Applet Package/Applet/Instance Management

The following section defines the AID values and application specific parameters used during download/installation of commerce applet 113 (FIG. 1). Table 20 defines AIDs.

TABLE 20

AIDs

| Description | AID |
| --- | --- |
| Package AID | A0 00 00 04 85 10 01 01 |
| Applet AID | A0 00 00 04 85 10 01 01 00 |
| Instance AID | A0 00 00 04 85 10 01 01 01 |

Applet-Specific Installation Parameters

The commerce applet's initial commerce services data characteristics may be provisioned via applet-specific installation parameters. This data follows the standard JavaCard AID and installation parameters.

These parameters must be coded as shown in Table 21:

TABLE 21

Applet Installation Parameters

| Provisioning Data | Byte Size | Default Value |
| --- | --- | --- |
| Maximum Number of Loyalty Records | 2 | 20 |
| Maximum Number of Pre-Load Merchant Records | 2 | 1 |
| Maximum Number of Transaction Records | 2 | 3 |
| Total: | 6 | |

Memory Requirements

Exemplary memory specifications are listed in Table 22 below. The first memory specification, "Package Download," indicates the approximate amount of non-volatile (EEPROM) memory space required to download the commerce applet package. The second memory specification, "Instantiation," indicates the amount of memory required to instantiate a new instance of the commerce applet. The final memory requirement, "Transient Data Space," indicates the amount of volatile (RAM) memory that is used by each instance of the commerce applet.

TABLE 22

Applet Memory Requirements

| Memory | Byte Size |
| --- | --- |
| Package Download | 9396 |
| Instantiation | 6260 |
| Transient Data Space | 518 |

Data Management

The available commerce (e.g., loyalty, offers, rewards, etc.) data is stored within the commerce applet 113 onboard the secure element 112. All of the relevant commerce data is stored in three separate data tables. These data tables are managed by the commerce applet 113. Additional commerce data may be stored/managed within a corresponding commerce widget 115 onboard the handset.

In one embodiment, the data elements defined herein have a variable length. Therefore, all elements (included those with a fixed length) will be assigned a maximum length. As a result, all lengths and byte size references should be interpreted as maximum values.

Commerce Data

Commerce applet 113 manages a few data fields that are shared by all commerce service applications. These data fields are stored in persistent data variables. An exemplary data element, Consumer ID, is defined in Table 23. Additional elements may be stored as well, such as consumer/platform keys and certificates.

TABLE 23

| Variable | Type | Description |
| --- | --- | --- |
| ConsumerID | byte[ ] | Unique consumer ID assigned to a specific MoCom consumer/user. |

Loyalty Data Table

Commerce applet 113 also includes loyalty data tables enabling the storage/management of all consumer loyalty data.

Table 24 defines the data elements (and their corresponding tag values used during TLV encoding) that are included in the loyalty data table.

TABLE 24

Loyalty Data

| Data Element | Tag Value | Byte Size | TLV Encoding Overhead |
| --- | --- | --- | --- |
| LOYALTY_PROGRAM_ID | 0xDF41 | 8 | 3 |
| LOYALTY_ACCOUNT_CODE | 0xDF43 | 32 | 3 |
| Total: | | 40 | 6 |
| Minimum TLV Encoded Record Size: | | | 46 |

The data is stored in a record oriented data buffer, where the loyalty identifier ("Loyalty ID") is utilized as the key field for search/retrieval tasks.

In an exemplary embodiment, TLV Data Overhead includes a (maximum) of five bytes per element data overhead (2-byte tag and 3-byte length) as required by the BER-TLV encoding format.

In an alternative embodiment, an index (or hash table) may be created internally to speed up the Loyalty ID search task.

Cached Merchant Data Table

Commerce applet 113 also includes a merchant cached data table enabling the storage/management of all data related to a given merchant. This feature allows the commerce data for a given merchant to be pre-loaded by the wallet application 114 in order to improve performance.

Table 25 defines the data elements (and their corresponding tag values used during TLV encoding) that are included in the cached merchant data table.

TABLE 25

Cached Merchant Data

| Data Element | Tag Value | Byte Size | TLV Encoding Overhead |
|---|---|---|---|
| MERCHANT_ID | 0xDF31 | 8 | 3 |
| LOYALTY_PROGRAM_ID | 0xDF41 | 8 | 3 |
| LOYALTY_ACCOUNT_CODE | 0xDF43 | 32 | 3 |
| OFFER_ID | 0xDF51 | 8 | 3 |
| OFFER_CODE | 0xDF53 | 130 | 3 |
| ... | | | |
| Maximum | | 104 | 6 |
| Minimum TLV Encoded Record Size: | | 110 | |

The data is stored in a record oriented data buffer, where the merchant identifier ("Merchant ID") is utilized as the key field for search/retrieval tasks. An index (or hash table) may be created internally to speed up the Merchant ID search task.

In an exemplary embodiment, TLV Data Overhead includes a (maximum) of five bytes per element data overhead (2-byte tag and 3-byte length) as required by the BER-TLV encoding format.

Transaction Log

Commerce applet 113 includes a transaction log that is used to track usage within the MoCom platform at the merchant point-of-sale. During commerce widget 115 and secure element 112 synchronization tasks, this transaction log is transmitted up to the commerce widget 115 for later over-the-air ("OTA") synchronization with the MoCom platform.

The actual content of the transaction log depends upon the Get Commerce Data command data/parameters provided by reader 120 during the transaction process at the merchant point-of-sale. An exact copy of the data payload sent to the commerce applet 113 by reader 120 via the Get Commerce Data APDU command is stored within that commerce transaction's record.

The transaction status is determined based on the logical result of the commerce data processing. If a data/processing error is detected within the commerce applet 113, the corresponding internal error code can be appended to the transaction log.

The following table defines the data elements (and their corresponding tag values used during TLV encoding) that are included in the transaction log.

TABLE 26

Transaction Log Data

| Data Element | Tag Value | Byte Size | TLV Encoding Overhead |
|---|---|---|---|
| Get Commerce Data command parameter(s)/data | xx | 255 | 4 |
| TRANSACTION_STATUS | 0xDF62 | 3 | 3 |
| Total: | | 266 | 7 |
| Maximum TLV Encoded Record Size: | | 273 | |

The data is stored in a record oriented data buffer. A variable Get Commerce Data command data size is supported.

TLV Data Overhead includes a (maximum) of five bytes per element data overhead (2-byte tag and 3-byte length) as required by the BER-TLV encoding format.

Error Management

In an exemplary embodiment, error detection and management is handled at two levels. First, the response of the APDU command includes a two-byte Status Word result value. These responses are standardized and dictated by ISO 7816-4. However, a second level of error handling is managed internally by the Commerce Services applet. The second level of management includes the issuance of a standard 0x6909 status word in the response to the APDU command. Following this response, the client may issue a second command ("Get Internal Error Code") to obtain a two-byte internal error code. This code may be cross-referenced to Table 27. Table 27 provides details on where and why the error occurred within the applet.

Particularly, Table 27 provides a master list of all possible internal error codes returned by the Get Internal Error Code APDU command supported by the commerce applet.

TABLE 27

Internal Error Codes

| Error Code | Error Description |
|---|---|
| 0x0101 | SSE_INTERNAL_ERROR_APPLET_NOT_PROVISION |
| 0x0102 | SSE_INTERNAL_ERROR_COMMAND_NOT_ALLOWED_VIA_CONTACTLESS_INTERFACE |
| 0x0103 | SSE_INTERNAL_ERROR_COMMAND_NOT_ALLOWED_INVALID_CONTEXT |
| 0x0201 | SSE_INSTALL_INVALID_INSTALLATION_PARAMETER_LENGTH |
| 0x0301 | SSE_PARSE_COMMAND_DATA_INVALID_COMMERCE_TAG |
| 0x0302 | SSE_PARSE_COMMAND_DATA_INVALID_CONSUMER_ID_LENGTH |
| 0x0302 | SSE_PARSE_COMMAND_DATA_INVALID_MERCHANT_ID_LENGTH |
| 0x0302 | SSE_PARSE_COMMAND_DATA_INVALID_MERCHANT_LOCATION_LENGTH |
| 0x0303 | SSE_PARSE_COMMAND_DATA_INVALID_DATE_TIME_STAMP_LENGTH |
| 0x0304 | SSE_PARSE_COMMAND_DATA_INVALID_MERCHANT_COMMERCE_APP_VERSION_LENGTH |
| 0x0305 | SSE_PARSE_COMMAND_DATA_INVALID_MERCHANT_CAPABILITIES_LENGTH |
| 0x0306 | SSE_PARSE_COMMAND_DATA_INVALID_LOYALTY_ID_LENGTH |
| 0x0307 | SSE_PARSE_COMMAND_DATA_INVALID_LOYALTY_ACCOUNT_CODE_LENGTH |
| 0x0308 | SSE_PARSE_COMMAND_DATA_INVALID_OFFER_ID_LENGTH |
| 0x0309 | SSE_PARSE_COMMAND_DATA_INVALID_OFFER_TYPE_CODE_LENGTH |
| 0x030A | SSE_PARSE_COMMAND_DATA_INVALID_TRANSACTION_ID_LENGTH |
| 0x030B | SSE_PARSE_COMMAND_DATA_INVALID_CACHED_MERCHANT_DATA_OFFER_COUNT_LENGTH |
| 0x030C | SSE_PARSE_COMMAND_DATA_INVALID_CACHED_MERCHANT_DATA_LENGTH |
| 0x030D | SSE_PARSE_COMMAND_DATA_INVALID_COMMERCE_TAG |
| 0x0A01 | SSE_GET_RESPONSE_REMAINING_DATA_INVALID_RESUME_STATE |
| 0x0B01 | SSE_VERIFY_REQUIRED_PARAMETERS_INVALID_PARAMETER_TAG |
| 0x0B02 | SSE_VERIFY_REQUIRED_PARAMETERS_DATE_TIME_STAMP_NOT_PRESENT |

TABLE 27-continued

Internal Error Codes

| Error Code | Error Description |
|---|---|
| 0x0B03 | SSE_VERIFY_REQUIRED_PARAMETERS_MERCHANT_ID_NOT_PRESENT |
| 0x0B04 | SSE_VERIFY_REQUIRED_PARAMETERS_MERCHANT_STORE_ID_NOT_PRESENT |
| 0x0B05 | SSE_VERIFY_REQUIRED_PARAMETERS_MERCHANT_COMMERCE_APP_VERSION_NOT_PRESENT |
| 0x0B06 | SSE_VERIFY_REQUIRED_PARAMETERS_MERCHANT_CAPABILITIES_NOT_PRESENT |
| 0x0B07 | SSE_VERIFY_REQUIRED_PARAMETERS_LOYALTY_ID_NOT_PRESENT |
| 0x0B08 | SSE_VERIFY_REQUIRED_PARAMETERS_LOYALTY_ACCOUNT_CODE_NOT_PRESENT |
| 0x0B0A | SSE_VERIFY_REQUIRED_PARAMETERS_CONSUMER_ID_NOT_PRESENT |
| 0x0B0B | SSE_VERIFY_REQUIRED_PARAMETERS_CACHED_MERCHANT_DATA_OFFER_COUNT_NOT_PRESENT |
| 0x0B0C | SSE_VERIFY_REQUIRED_PARAMETERS_EMBEDDED_TLV_CACHED_MERCHANT_DATA_NOT_PRESENT |
| 0x0C01 | SSE_GET_COMMERCE_DATA_INVALID_WALLET_STATE |
| 0x0E01 | SSE_UPDATE_CACHED_MERCHANT_DATA_FAILED_CMD_BUFFER_LENGTH_EXCEEDED |
| 0x1101 | LME_INVALID_LOYALTY_TAG |
| 0x1102 | LME_INVALID_LOYALTY_ID_LENGTH |
| 0x1103 | LME_INVALID_LOYALTY_ACCOUNT_CODE_LENGTH |
| 0x1201 | LME_GET_LOYALTY_DATA_RECORD_NOT_FOUND |
| 0x1202 | LME_GET_LOYALTY_DATA_INSUFFICIENT_BUFFER_LENGTH |
| 0x1301 | LME_UPDATE_LOYALTY_ID_NOT_SPECIFIED |
| 0x1401 | LME_DELETE_LOYALTY_ID_NOT_SPECIFIED |
| 0x1402 | LME_DELETE_LOYALTY_DATA_RECORD_NOT_FOUND |
| 0x1501 | LME_GET_LOYALTY_RECORD_INSUFFICIENT_BUFFER_LENGTH |
| 0x3101 | TLVME_MAX_DATA_LENGTH_EXCEEDED |
| 0x3201 | TLVME_APPEND_FAILED_INVALID_LENGTH |
| 0x3301 | TLVME_GET_NEXT_TAG_FAILED_INVALID_CONTEXT_NO_CURRENT_TAG |
| 0x3401 | TLVME_GET_TLV_OBJECT_FAILED_INVALID_TAG_CLASS |
| 0x3402 | TLVME_GET_TLV_OBJECT_FAILED_INVALID_LENGTH |
| 0x3403 | TLVME_GET_TLV_OBJECT_FAILED_TLV_LENGTH_NOT_SUPPORTED |
| 0x3501 | TLVME_GET_NEXT_ELEMENT_FAILED_INVALID_TAG_CLASS |
| 0x3502 | TLVME_GET_NEXT_ELEMENT_FAILED_TLV_LENGTH_NOT_SUPPORTED |
| 0x3503 | TLVME_GET_NEXT_ELEMENT_FAILED_INVALID_LENGTH |
| 0x3504 | TLVME_GET_NEXT_ELEMENT_FAILED_BUFFER_LENGTH_EXCEEDED |
| 0x4101 | DME_DATAMANAGER_INVALID_RECORD_NUMBER |
| 0x4102 | DME_DATAMANAGER_INVALID_RECORD_LENGTH |
| 0x4103 | DME_DATAMANAGER_RECORD_NOT_INITIALIZED |
| 0x4104 | DME_DATAMANAGER_RECORD_STORE_FULL |
| 0x4105 | DME_DATAMANAGER_INVALID_DATA_LENGTH |
| 0x4106 | DME_DATAMANAGER_INSUFFICIENT_BUFFER_SIZE |
| 0x4201 | DME_DATAMANAGER_PRIMARY_INDEX_NOT_ACTIVE |
| 0x4202 | DME_DATAMANAGER_PRIMARY_INDEX_KEY_NOT_SPECIFIED |
| 0x4203 | DME_DATAMANAGER_INVALID_PRIMARY_INDEX_KEY_LENGTH |
| 0xA201 | SUE_NO_INSTALL_PARAMETERS_FOUND |
| 0xA202 | SUE_INSUFFICIENT_APPLICATION_PARAMETER_BUFFER_LENGTH |
| 0xA203 | SUE_NO_APPLICATION_SPECIFIC_INSTALL_PARAMETERS_FOUND |
| 0xD101 | SSE_SECURITY_AUTHENTICATION_FAILED |
| 0xD102 | SSE_SECURITY_INVALID_CIPHER_DATA_LENGTH |
| 0xD103 | SSE_SECURITY_INVALID_KEY_DATA_LENGTH |
| 0xD104 | SSE_SECURITY_INVALID_DIVERSIFICATION_DATA_LENGTH |
| 0xDC00 | SSE_SECURITY_CRYPTO_EXCEPTION_UNDEFINED_REASON |
| 0xDC01 | SSE_SECURITY_CRYPTO_EXCEPTION_ILLEGAL_VALUE |
| 0xDC02 | SSE_SECURITY_CRYPTO_EXCEPTION_UNINITIALIZED_KEY |
| 0xDC03 | SSE_SECURITY_CRYPTO_EXCEPTION_NO_SUCH_ALGORITHM |
| 0xDC04 | SSE_SECURITY_CRYPTO_EXCEPTION_INVALID_INIT |
| 0xDC05 | SSE_SECURITY_CRYPTO_EXCEPTION_ILLEGAL_USE |

Commerce Services

The following section provides a detailed description of the APDU commands available via the commerce applet 113.

APDU Commands

All communications/data exchanges with the commerce applet 113 will be performed via APDU commands as defined in the ISO 7816 standards. Additional restrictions and data handling are described below.

Command Usage Restrictions

For security reasons, a subset of the available commerce service commands can be restricted to specific connection modes. In one embodiment, referred to as "contact (wallet) mode," all of the APDU commands defined in Table 18 above are available. However, in contactless mode, the following commands are allowed:

Get Version
Get Internal Error Code
Get Response (Remaining Data)
Get Commerce Data If any other APDU command is sent in contactless mode, an exception is thrown and the Internal Error Code is set to the corresponding invalid command mode value (0x0102).

In one embodiment, the Get Commerce Data command may only be successfully executed when wallet application 114 is open. When the wallet application 114 is either started or terminated by the consumer, it is the responsibility of the wallet application 114 to notify a wallet companion applet (WCAp) so that it can perform monitoring, management and/or security functions. The WCAp applet, in turn, notifies the commerce applet of the wallet application state via a shared interface. WCAp applets are discussed in U.S. patent application Ser. No. 13/857,400 entitled "Systems, Methods, and Computer Program Products For Securing And Managing Applications On Secure Elements," which is hereby incorporated by reference in its entirety.

Data Payload Management

Commerce applet 113 validates that all required parameters have been included in the data payload. However, in most cases all non-relevant data elements can be ignored and a command will still process normally. In one embodiment, the length expected (Le) value is not verified by the commerce applet 113. It can be assumed to be the value zero, allowing the commerce applet 113 to send all available data via the response.

Get Version

The Get Version command is used to obtain the version information of the currently loaded commerce applet 113. The version will be stored in three bytes (xx.yy.zz), where xx=release version, yy=major version (Wave) number, and zz=minor version number. This information is assigned by, for example, a MoCom platform system, specified during applet development or packaging, or stored as a static value within the code, and cannot be changed.

Table 28 defines the settings for the Get Version APDU command:

TABLE 28

Internal Get Version

| CLA | INS | P1 | P2 | Lc | Data | Le |
|-----|-----|----|----|----|------|----|
| 90 | 10 | 00 | 00 | 00 | <none> | 3 |

In one embodiment, no data is sent to the commerce applet. The Lc data length is 0x00.

The version information is contained within a three-byte response. The Le data length is 0x03. A length of 0x00 is also allowed. Exemplary response data elements are defined in Table 29:

TABLE 29

Response Data

| Data Element | Byte Size | Value |
|---|---|---|
| Commerce Specification Version Tag | 1 | 0xDF12 |
| Commerce Specification Version Length | 1 | 3 |
| Commerce Specification Version Value | 3 | [Version (xx.yy.zz)] |
| Total: | 5 | |

Table 30 defines the possible Status Word values that may be returned by this command.

TABLE 30

Status Codes

| SW1 | SW2 | Description |
|---|---|---|
| 90 | 00 | Successful Execution of Command |
| 67 | 00 | Wrong Data Length |
| 69 | 09 | Internal Error |

Provision Applet

An applet provisional command, "Provision Applet," allows the provisioning (or update) of the consumer related data, including the consumer ID and optionally related security data (key value and certificates). The new/updated data values are specified via the command data. In an exemplary embodiment, the Provision Applet command may only be used to update the Consumer ID.

Tables 31 and 32 define the settings for the Provision Applet APDU command:

TABLE 31

Provision Applet

| CLA | INS | P1 | P2 | Lc | Data | Le |
|-----|-----|----|----|----|------|----|
| 90 | 12 | 00 | 00 | XX | TLV-Encoded Provisioning Data | 00 |

The incoming data, illustrated in table 31, consists of the TLV encoded provisioning data. Therefore, the Lc data length is variable.

In one embodiment, no data is returned by the commerce applet 113. The Le data length is 0x00.

TABLE 32

Command Data

| Data Element | Byte Size* | Value |
|---|---|---|
| Provisioning Data Element Tag | 1 | [Element Tag] |
| Element Data Length | 1 | xx |
| Element Data Value | xx | [Data] |
| Total: | <var> | |

Table 33 defines the possible Status Word values that may be returned by Provision Applet command

TABLE 33

Status Codes

| SW1 | SW2 | Description |
|---|---|---|
| 90 | 00 | Successful Execution of Command |
| 67 | 00 | Wrong Data Length |
| 69 | 09 | Internal Error |

Get Consumer Info

The Get Consumer Info command is used to obtain a subset of static data related to the token owner (i.e., consumer). This data includes the following:

Consumer Identifier

Table 34 defines the settings for the Get Consumer Info APDU command:

TABLE 34

Get Consumer Info

| CLA | INS | P1 | P2 | Lc | Data | Le |
|-----|-----|----|----|----|------|----|
| 90 | 14 | 00 | 00 | 00 | <none> | 00 |

No data is sent to the commerce applet 113. The Lc data length is, for example, 0x00. The actual length of the requested consumer information returned by the applet is variable, specific to the available consumer data. Therefore, the Le data length is 0x00, allowing the applet to manage a variable length response.

The response data is returned as a TLV formatted data steam. The Consumer ID may also be returned.

TABLE 35

Response Data

| Data Element | Byte Size | Value |
|---|---|---|
| Consumer ID Tag | 1 | 0xDF21 |
| Consumer ID Length | 1 | 16 |
| Consumer ID | 16 | [Consumer ID] |
| Total: | <var> | |

Table 36 defines the possible Status Word values that may be returned by this command.

TABLE 36

Status Codes

| SW1 | SW2 | Description |
|---|---|---|
| 90 | 00 | Successful Execution of Command |
| 67 | 00 | Wrong Data Length |
| 69 | 09 | Internal Error |

Get Commerce Data

The Get Commerce Data command provides commerce information (e.g., loyalty, offers and rewards) for a specified merchant (or set of merchants), based on the specified merchant/loyalty identifiers and supported offer types. This command provides a single point of contact for reader 120 attached to the merchant POS system (e.g., POS terminal).

A date/time stamp, merchant ID, store ID, commerce protocol version, and merchant capabilities byte can be sent as part of the incoming data. Additional loyalty identifiers may also be sent in order to specify (filter) the loyalty information requested. The applet shall search a loyalty data table (Table 5), for the specified merchant/loyalty program ID(s) and retrieve the corresponding loyalty data. Additional offer type codes may be also sent as part of the incoming data in order to specify the type of offer information requested. The commerce applet 113 searches the cached merchant data table (Table 25) for the specified merchant identifier/offer code(s) and retrieves the corresponding offer data.

Required Parameters include:
  Date/Time Stamp
  Merchant ID
  Store ID
  App Version Once transmission has been successfully completed, the applet shall create an entry in its transaction log recording the commerce data request.

Tables 37 and 38 define the settings for the Get Commerce Data APDU command:

TABLE 37

Get Commerce Data

| CLA | INS | P1 | P2 | Lc | Data | Le |
|---|---|---|---|---|---|---|
| 90 | 50 | 00 | 00 | xx | | 00 |

The incoming data consists of a date/time stamp (used for transaction logging), merchant identifier, store identifier, merchant capabilities byte, and an optional set of additional data elements, including one or more additional loyalty identifiers (indicating loyalty programs supported by the merchant location), and additional offer codes (indicating the type of offers supported by the merchant location). In one embodiment, if a merchant does not specify a Merchant Capability parameter, a default mode supporting only merchant based loyalty and offers is used.

The actual length of the requested commerce data returned by the applet is variable specific to the available loyalty/offers related data. Therefore, the Le data length is 0x00, allowing the applet to manage a variable length response.

TABLE 38

Command Data

| Data Element | Byte Size | Value |
|---|---|---|
| Date/Time Stamp Tag | 1 | 0xDF11 |
| Date/Time Stamp Length | 1 | 7 |
| Date/Time Stamp | 7 | [Date/Time Stamp] |
| Merchant ID Tag | 1 | 0xDF31 |
| Merchant ID Length | 1 | 8 |
| Merchant ID | 8 | [Merchant ID] |
| Store ID Tag | 1 | 0x32 |
| Store ID Length | 1 | 32 |
| Store ID | 32 | [Store ID] |
| Commerce Version Tag | 1 | 0xDF12 |
| Commerce Version Length | 1 | 3 |
| Commerce Version Data | 2 | [Commerce App Version] |
| Merchant Capability Tag | 1 | 0xDF33 |
| Merchant Capability Length | 1 | 2 |
| Merchant Capability Data | 1 | [Merchant Capability Code] |
| Transaction ID Tag | 1 | 0xDF61 |
| Transaction ID Length | 1 | 16 |
| Transaction ID | 16 | [Transaction ID] |
| Additional Loyalty ID Tag | 1 | 0xDF41 |
| Additional Loyalty ID Length | 1 | 8 |
| Additional Loyalty ID | 8 | [Loyalty ID] |
| . . . | | |
| Additional Offer Type Tag | 1 | 0xDF54 |
| Additional Offer Type Length | 1 | 9 |
| Additional Offer Type Code | 9 | [Offer Type Code] |
| . . . | | |
| Total: | <var> | |

The response data is returned as a TLV formatted data steam. The MoCom platform-specific consumer identifier and all relevant loyalty/offers data are returned in a single data payload.

Consumer ID

The Consumer ID is sent in TLV format, where the data is sent using the tag CONSUMER_ID (0XDF21). In one embodiment, unless an error is detected, the consumer ID shall always be returned.

Loyalty

In one embodiment, each instance of loyalty data shall consist of the following TLV encoded data elements:
  Loyalty Identifier
  Loyalty Account Code Within this data stream, the first tag shall contain the Loyalty Identifier tag (T) byte (0xDF41). The length (L) byte shall specify the length of the Loyalty Identifier. The value (V) shall contain the actual Loyalty Identifier of L length for the corresponding Loyalty Data that will immediately follow.

The second tag should contain the Loyalty Account Code tag (T) byte (0xDF43). The length (L) byte shall specify the total length of the account code data linked to the previous Loyalty Identifier. The value (V) shall contain the actual loyalty data of L length.

Any additional loyalty identifiers found within the loyalty data table are appended to the TLV encoded data payload using this same format.

Offers

Each instance of offer data shall consist of the following TLV encoded data elements:

Offer ID

Offer Code

Within this data stream, the first tag contains the Offer ID tag (T) byte (0xDF51). The length (L) byte specifies the length of the Offer ID. The value (V) contains the Offer ID for the corresponding offer data that will immediately follow.

The second tag preferably contains the Offer Code tag (T) byte value (0xDF53). The length (L) byte specifies the length of the Offer Type Code. The value (V) contains the Offer Code data for the corresponding Offer ID.

Any additional offer identifiers found within the offer data table are appended to the TLV encoded data payload using this same format. Exemplary response data is defined in Table 39.

TABLE 39

Response Data

| Data Element | Byte Size | Value |
|---|---|---|
| Consumer Identifier Tag | 1 | 0xDF21 |
| Consumer Identifier Length | 1 | 16 |
| Consumer Identifier | 16 | [Consumer ID] |
| Loyalty Identifier Tag | 1 | 0xDF41 |
| Identifier Length | 1 | 8 |
| Loyalty Identifier | 8 | [Loyalty ID] |
| Loyalty Account Code Tag | 1 | 0xDF43 |
| Account Code Length | 1 | 32 |
| Loyalty Account Code | 32 | [Acct Code] |
| . . . | | |
| Offer ID Tag | 1 | 0xDF51 |
| Offer ID Length | 1 | 8 |
| Offer ID Value | 8 | [Offer ID] |
| Offer Code Tag | 1 | 0xDF53 |
| Offer Code Length | 1 | 130 |
| Offer Code Value | 130 | [Offer Code] |
| . . . | | |
| Total: | <var> | |

Commerce applet 113 manages the transmission of multiple response packets (using the Get Response command) when the total data length exceeds 256 bytes. Table 40 defines the possible Status Word values that may be returned by the Get Response command.

TABLE 40

Status Codes

| SW1 | SW2 | Description |
|---|---|---|
| 90 | 00 | Successful Execution of Command |
| 61 | 00 | Successful Execution of Command w/ Additional data available via Get Response |
| 67 | 00 | Wrong Data Length |
| 69 | 09 | Internal Error |

Post Transaction Data

The Post Transaction Data command provides a method through which the Merchant PoS system or payment terminal may return post-transaction data, including redeemed coupons, new offers, e-receipts, or other enhanced commerce data.

Tables 41 and 42 define the settings for the Post Transaction Data APDU command:

TABLE 41

Post Transaction Data

| CLA | INS | P1 | P2 | Lc | Data | Le |
|---|---|---|---|---|---|---|
| 90 | 52 | 00 | 00 | xx | <TLV-Encoded Transaction Data> | 00 |

The incoming data consists of the TLV encoded provisioning data and a platform signature for authenticity purposes. Therefore, the Lc data length is variable.

Data need not be returned by commerce applet 113. The Le data length is 0x00.

TABLE 42

Command Data

| Data Element | Byte Size | Value |
|---|---|---|
| Post Transaction Data Element Tag | 1 | [Element Tag] |
| Element Data Length | 1 | xx |
| Element Data Value | xx | [Data] |
| . . . | | |
| Total: | <var> | |

Table 43 defines the possible Status Word values that may be returned by the Post Transaction Data command.

TABLE 43

Status Codes

| SW1 | SW2 | Description |
|---|---|---|
| 90 | 00 | Successful Execution of Command |
| 67 | 00 | Wrong Data Length |
| 69 | 09 | Internal Error |

Get Transaction Log

The Get Transaction Log is used to obtain all data stored in the transaction log. This command is typically used by the commerce widget for the purpose of widget and secure element data synchronization tasks.

Table 44 defines the settings for the Get Transaction Log APDU command:

TABLE 44

Get Transaction Log

| CLA | INS | P1 | P2 | Lc | Data | Le |
|---|---|---|---|---|---|---|
| 90 | 54 | 00 | 0x | 00 | <none> | |

| P2 Value | Applet Behavior |
|---|---|
| 0x00 | Normal processing. |
| 0x01 | Clear transaction log. No data transmitted. |
| 0x02 | Get Transaction Log Status |

In one embodiment, no data is sent to the commerce applet. The Lc data length is 0x00. The actual length of the transaction data returned by the applet is variable, depending on the number of transaction records and the variable length of the corresponding transaction log data. Therefore, the Le data length can be 0x00, allowing commerce applet 113 to manage variable length response.

Preferably, response data is returned as a TLV formatted data steam.

Transaction Log Response Data

Each transaction log record shall consist of an Embedded-TLV Transaction Log tag followed by all related data elements. The data elements included in the transaction record are a mirror of those provided during the corresponding Get Commerce Data command requested by the Commerce-enabled payment terminal (NFC reader) at the merchant point-of-sale. Additional transaction log records are appended to the data using the same format. Table 45 illustrates exemplary response data.

TABLE 45

Response Data

| Data Element | Byte Size | Value |
|---|---|---|
| Embedded TLV Transaction Record Tag | 1 | 0xDF60 |
| Embedded TLV Transaction Record Length | 3 | xx |
| TLV-encoded transaction data | xx | xx |
| ... | | |
| Total: | <var> | |

In one embodiment, commerce applet 113 manages the transmission of multiple response packets using the Get Response command when the total data length exceeds 256 bytes.

Transaction Log Status Response Data

When the transaction log status is requested, the commerce applet responds with status information within an embedded TLV data payload. This data includes the number of available transaction log records, loyalty and offer records sent during the last transaction. This is the same data payload provided to WCAp via the shared interface. Table 46 illustrates exemplary response data.

TABLE 46

Response Data

| Data Element | Byte Size | Value |
|---|---|---|
| Embedded TLV Transaction Status Tag | 1 | 0xE4 |
| Embedded TLV Transaction Record Length | 1 | 0x0C |
| Transaction Record Count Tag | 1 | 0xDB |
| Transaction Record Count Length | 1 | 0x02 |
| Transaction Record Count Value | 2 | xx |
| Last Transaction Loyalty Count Tag | 1 | 0xDC |
| Last Transaction Loyalty Count Length | 1 | 0x02 |
| Last Transaction Loyalty Count Value | 2 | xx |
| Last Transaction Offer Count Tag | 1 | 0xDD |
| Last Transaction Offer Count Length | 1 | 0x02 |
| Last Transaction Offer Count Value | 2 | xx |
| Total: | 14 | |

Table 47 defines possible Status Word values that may be returned by the Get Transaction Log command.

TABLE 47

Status Codes

| SW1 | SW2 | Description |
|---|---|---|
| 90 | 00 | Successful Execution of Command |
| 61 | 00 | Successful Execution of Command w/ Additional data available via Get Response |
| 67 | 00 | Wrong Data Length |
| 6B | 00 | Wrong P1/P2 Parameter |
| 69 | 09 | Internal Error |

Get Internal Error Code

The Get Internal Error Code command is used to retrieve the last internal error code generated by the Commerce Services applet. This code provides a value that can be cross-referenced with the Internal Error Codes table (Table 26), providing a more specific description of the error. This command is used for more detailed diagnostic and error resolution.

Table 48 defines the settings for the Get Internal Error Code APDU command:

TABLE 48

Get Internal Error Code

| CLA | INS | P1 | P2 | Lc | Data | Le |
|---|---|---|---|---|---|---|
| 90 | 70 | 00 | 00 | 00 | <none> | 02 |

In one embodiment, no data is sent to the applet. The Lc data length is 0x00. The error code is contained within a two-byte response. Therefore, the Le data length is 0x02.

The following table defines the possible Status Word values that may be returned by this command.

TABLE 49

Status Codes

| SW1 | SW2 | Description |
|---|---|---|
| 90 | 00 | Successful Execution of Command |
| 67 | 00 | Wrong Data Length |
| 69 | 09 | Internal Error |

Loyalty Services

Get Loyalty Data

The Get Loyalty Data command defined in Tables 50 and 51 is used to obtain the stored loyalty information based on a specified loyalty identifier. The two-byte loyalty identifier may be sent as part of the incoming data in order to specify the loyalty information requested. Commerce applet 113 searches a table of loyalty data for the specified merchant/loyalty ID and retrieves all of the corresponding loyalty data.

TABLE 50

Get Loyalty Data

| CLA | INS | P1 | P2 | Lc | Data | Le |
|---|---|---|---|---|---|---|
| 90 | 30 | 00 | 00 | xx | [TLV-Encoded Loyalty ID] | 00 |

The (optional) incoming data shall consist of a TLV encoded loyalty identifier indicating the loyalty information requested. If Lc is set to 0x00 (no data incoming data is specified), all available loyalty identifiers are returned.

The actual length of the requested loyalty data returned by the applet is variable specific to the requested/available loyalty data. Therefore, the Le data length is 0x00, allowing the applet to manage a variable length response.

TABLE 51

Command Data

| Data Element | Byte Size | Value |
|---|---|---|
| Loyalty Identifier Tag | 1 | 0xDF41 |
| Loyalty Identifier Length | 1 | 8 |

TABLE 51-continued

| Command Data | | |
|---|---|---|
| Data Element | Byte Size | Value |
| Loyalty Identifier | 8 | [Loyalty ID] |
| Total: | <var> | |

The response data (Table 51) is returned as a TLV formatted data stream. All of the relevant loyalty data is returned in a single data payload.

In one embodiment, if a loyalty data dump is requested (Lc=0x00), a list of all Loyalty Identifiers is returned in LV (no tag) format. Thus, only the Loyalty Identifier for each entry is included in the data payload.

Each instance of loyalty data includes the following data elements:
Loyalty Identifier
Loyalty Account Code

TABLE 52

| Response Data | | |
|---|---|---|
| Data Element | Byte Size | Value |
| Loyalty Identifier Tag | 1 | 0xDF41 |
| Identifier Length | 1 | 8 |
| Loyalty Identifier | 8 | [Loyalty ID] |
| Loyalty Account Code Tag | 1 | 0xDF43 |
| Account Code Length | 1 | xx |
| Loyalty Account Code | xx | [Acct Code] |
| Total (Max): | <var> | |

Table 53 defines the possible Status Word values that may be returned by this command.

TABLE 53

| Status Codes | | |
|---|---|---|
| SW1 | SW2 | Description |
| 90 | 00 | Successful Execution of Command |
| 61 | 00 | Successful Execution of Command w/ Additional data available via Get Response |
| 67 | 00 | Wrong Data Length |
| 69 | 09 | Internal Error |

Update Loyalty Data

The Update Loyalty Data command is used to add or update the specified merchant loyalty data. The data is sent as TLV formatted data stream. If the specified loyalty identifier exists, the corresponding loyalty data elements are updated. If the loyalty identifier does not exist, a new data record is created in the loyalty data table. Tables 54 and 55 define the settings for the Update Loyalty Data APDU command:

TABLE 54

| Update Loyalty Data | | | | | | |
|---|---|---|---|---|---|---|
| CLA | INS | P1 | P2 | Lc | Data | Le |
| 90 | 32 | 00 | 00 | xx | TLV-Encoded Loyalty Data | 00 |

The incoming data shall consist of TLV encoded loyalty data. Therefore, the Lc data length is variable. In one embodiment, no data is returned by the applet. The Le data length is be 0x00.

TABLE 55

| Command Data | | |
|---|---|---|
| Data Element | Byte Size | Value |
| Loyalty Identifier Tag | 1 | 0xDF41 |
| Identifier Length | 1 | 8 |
| Loyalty Identifier | 8 | [Loyalty ID] |
| Loyalty Account Code Tag | 1 | 0xDF43 |
| Account Code Length | 1 | xx |
| Loyalty Account Code | Xx | [Acct Code] |
| Total: | <var> | |

Table 56 defines the possible Status Word values that may be returned by this command.

TABLE 56

| Status Codes | | |
|---|---|---|
| SW1 | SW2 | Description |
| 90 | 00 | Successful Execution of Command |
| 67 | 00 | Wrong Data Length |
| 69 | 09 | Internal Error |

Delete Loyalty Data

The Delete Loyalty Data command is used to delete the specified merchant loyalty data. The one-byte merchant code is specified via the command data. Alternatively, the P2 byte may be used to purge all existing offers. If P2 is set to 0xFF, the entire offer data store is deleted.

Tables 57 and 58 define the settings for the Delete Loyalty Data APDU command:

TABLE 57

| Delete Loyalty Data | | | | | | |
|---|---|---|---|---|---|---|
| CLA | INS | P1 | P2 | Lc | Data | Le |
| 90 | 34 | 00 | xx | xx | TLV-Encoded Loyalty ID | 00 |

The incoming data consists of a TLV-encoded loyalty identifier. Therefore, the Lc data length is variable.

In one embodiment, no data is returned by commerce applet 113. The Le data length is 0x00.

TABLE 58

| Command Data | | |
|---|---|---|
| Data Element | Byte Size | Value |
| Loyalty Identifier Tag | 1 | 0xDF41 |
| Loyalty Identifier Length | 1 | xx |
| Loyalty Identifier | Xx | [Loyalty ID] |
| Total: | <var> | |
| P2 Value | Applet Behavior | |
| 0x00 | Normal processing. | |
| 0xFF | Purge loyalty table (delete all records) | |

Table 59 defines the possible Status Word values that may be returned by the Delete Loyalty Data command.

TABLE 59

| | Status Codes | |
|---|---|---|
| SW1 | SW2 | Description |
| 90 | 00 | Successful Execution of Command |
| 67 | 00 | Wrong Data Length |
| 69 | 09 | Internal Error |

Merchant Cached Data Services

Get Cached Merchant Data

The Get Cached Merchant Data command is used to obtain all previously loaded data pertaining to a specific merchant. The merchant identifier may be sent as part of the incoming data in order to specify the pre-loaded data requested. If provided, the commerce applet searches a table of cached merchant data for the specified merchant ID and retrieves all of the corresponding data. This command may also be used to obtain information on all cached merchants stored within the Commerce Services applet.

Table 60 defines the settings for the Get Cached Merchant Data APDU command:

TABLE 60

| | | Get Cached Merchant Data | | | | |
|---|---|---|---|---|---|---|
| CLA | INS | P1 | P2 | Lc | Data | Le |
| 90 | 56 | 00 | 00 | xx | <none> | 00 |

In one embodiment, no data is sent to the applet. The Lc data length is 0x00. The actual length of the requested cached merchant data returned by the applet is variable, specific to the requested/available cached merchant data. Therefore, the Le data length is 0x00; allowing the applet to manage a variable length response.

The response data (Table 61) may be returned as a TLV formatted data stream. All of the cached data is returned in a single data payload. Each instance of cached merchant data includes the following corresponding cached merchant data elements (if available):

Merchant Identifier

Loyalty Identifier

Loyalty Account Code

Offer Identifier(s)

Offer Code(s)

TABLE 61

| Response Data | | |
|---|---|---|
| Data Element | Byte Size | Value |
| Merchant ID Tag | 1 | 0xDF31 |
| Merchant ID Length | 1 | 8 |
| Merchant ID | 8 | [Merchant ID] |
| Loyalty ID Tag | 1 | 0xDF41 |
| Loyalty ID Length | 1 | 8 |
| Loyalty ID Value | 8 | [Loyalty ID] |
| Loyalty Account Code Tag | 1 | 0xDF43 |
| Loyalty Account Code Length | 1 | 32 |
| Loyalty Account Code Value | 32 | [Loyalty Account Code] |
| . . . | | |
| Offer ID Tag | 1 | 0xDF51 |
| Offer ID Length | 1 | xx |
| Offer ID Value | Xx | [Offer ID] |
| Offer Code Tag | 1 | 0xDF53 |

TABLE 61-continued

| Response Data | | |
|---|---|---|
| Data Element | Byte Size | Value |
| Offer Code Length | 1 | xx |
| Offer Code Value | Xx | [Offer Code] |
| . . . | | |
| Total: | <var> | |

In an exemplary embodiment, the cached merchant data will be loaded/managed by the wallet application and may include multiple offer IDs/codes pertaining to that specific merchant. However, the applet shall prefix the consumer identifier to the response data and append any additional loyalty/offer data requested by the Get Commerce Data command.

Table 62 defines the possible Status Word values that may be returned by this command.

TABLE 62

| | Status Codes | |
|---|---|---|
| SW1 | SW2 | Description |
| 90 | 00 | Successful Execution of Command |
| 67 | 00 | Wrong Data Length |
| 69 | 09 | Internal Error |

Update Cached Merchant Data

The Update Cached Merchant Data command is used to update the cached (quick-response) data for a specified merchant. The data is sent as TLV formatted data stream, similar to the response data returned by the Get Commerce Data command. This command is used to pre-load a given merchant's Get Commerce Data response.

Tables 63 and 64 define the settings for the Update Cached Merchant Data APDU command:

TABLE 63

| | | Update Cached Merchant Data | | | | |
|---|---|---|---|---|---|---|
| CLA | INS | P1 | P2 | Lc | Data | Le |
| 90 | 58 | 00 | 0x | xx | TLV-Encoded Cached Merchant Data] | 02 |

| P2 Value | Applet Behavior |
|---|---|
| 0x00 | Normal processing. |
| 0x01 | APDU Chain (data will be appended to CMD buffer) |
| 0Xff | Delete cached merchant data [Lc = 0] |

The incoming data consists of embedded TLV encoded cached merchant data. Therefore, the Lc data length is variable.

Commerce applet returns a two byte response containing the number of available bytes remaining in the cached merchant data buffer. Therefore, the Le data length is 0x02 (or 0x00).

TABLE 64

| Command Data | | |
|---|---|---|
| Data Element | Byte Size | Value |
| Merchant ID Tag | 1 | 0xDF31 |
| Merchant ID Length | 1 | 8 |
| Merchant ID Value | 8 | [Merchant ID] |
| Cached Merchant Data Offer Count Tag | 1 | 0x57 |

TABLE 64-continued

Command Data

| Data Element | Byte Size | Value |
|---|---|---|
| Cached Merchant Data Offer Count Length | 1 | 1 |
| Cached Merchant Data Offer Count Value | 1 | [CMD Offer Count] |
| Embedded TLV Cached Merchant Data Tag | 1 | 0x58 |
| Embedded TLV Cached Merchant Data Length | Xx | xx |
| Offer ID Tag | 1 | 0xDF51 |
| Offer ID Length | 1 | xx |
| Offer ID Value | Xx | [Offer ID] |
| Offer Code Tag | 1 | 0xDF53 |
| Offer Code Length | 1 | xx |
| Offer Code Value | Xx | [Offer Code] |
| ... | | |
| Total: | <var> | |

The response data (Table 65) returned by the command consists of a 2-byte (short) value representing the number of remaining bytes available in the cached merchant data buffer. This allows the wallet application 114 to manage how many cached offers can "fit" into the Commerce Services applet.

TABLE 65

Response Data

| Data Element | Byte Size | Value |
|---|---|---|
| Available Cached Merchant Data Buffer (bytes) Size | 2 | xx |
| Total: | 2 | |

Table 66 defines the possible Status Word values that may be returned by this command.

TABLE 66

Status Codes

| SW1 | SW2 | Description |
|---|---|---|
| 90 | 00 | Successful Execution of Command |
| 67 | 00 | Wrong Data Length |
| 69 | 09 | Internal Error |

Table 67 defines the data elements and corresponding tag values and target/max byte sizes used by commerce based applications according to the example aspects described herein. Additional values have been provided for those elements with a limited/fixed value range.

TABLE 67

| Data Element | Tag | Max Size | Description |
|---|---|---|---|
| Commerce Services Shared Data Elements | | | |
| DATE_TIME_STAMP | 0x11 | 7 | Date/Time stamp |
| COMMERCE_APP_VERSION | 0x12 | 3 | Supported Commerce App Version Number |
| Consumer Data Elements | | | |
| CONSUMER_ID | 0x21 | 16 | MoCom Platform specific consumer identifier |
| CONSUMER_KEY | 0x22 | 16 | MoCom Platform generated consumer specific 3DES key |
| CONSUMER_CERT | 0x23 | 8 | MoCom Platform generated consumer signature/certificate |
| Merchant Data Elements | | | |
| MERCHANT_ID | 0x31 | 8 | MoCom Platform specific merchant identifier |
| MERCHANT_STORE_ID | 0x32 | 32 | MoCom Platform specific merchant store identifier |
| MERCHANT_CAPABILITY | 0x33 | 2 | Supported Commerce App Services |
| READER_START_MODE | 0x34 | 2 | NFC enabled payment terminal startup mode (provided by Merchant POS System during init) |

| Data Element | Value | Max Size | Description |
|---|---|---|---|
| Merchant Capabilities | | | |
| MERCAP_MERCHANT_LOYALTY | 0x80 | 1 | The Get Commerce Data includes a valid merchant identifier used to determine the Loyalty data received by the applet. |
| MERCAP_ADDITIONAL_LOYALTY | 0x40 | 1 | The Get Commerce Data request includes additional Loyalty Identifiers. Additional Loyalty data is determined by the specified Loyalty ID(s). |

TABLE 67-continued

| | | | |
|---|---|---|---|
| MERCAP_MERCHANT_OFFERS | 0x20 | 1 | Offer type fields aincluded in Get Commerce Data request |
| MERCAP_ADDITIONAL_OFFERS | 0x10 | 1 | The Get Commerce Data includes a valid merchant identifier used to determine the offers data received by the applet. |
| MERCAP_PAYMENT | 0x08 | 1 | Merchant supports contactless payment. |
| MERCAP_CLOUD | 0x02 | 1 | The merchant supports cloud redemption. Only the Consumer ID will be returned by the applet for resolution in the cloud. |
| MERCAP_REDEMPTION | 0x01 | 1 | The Merchant & Payment Terminal support the transmission of offer redemption data (from the ECR) to the applet via the Post Transaction command. |
| MoCom Platform Data Elements | | | |
| PLATFORM_SIGNATURE | 0x71 | 8 | MoCom Platform generated MAC/Signature appended to command/data originating from the platform for remote verification purposes (data integrity/authenticity). |
| PLATFORM_KEY | 0x72 | 16 | MoCom Platform Key |
| PLATFORM_CERT | 0x73 | 8 | MoCom Platform Certificate |

Loyalty
Loyalty Data Elements

| Data Element | Tag | Max Size | Description |
|---|---|---|---|
| EMBEDDED_TLV_LOYALTY_DATA | 0x40 | xx | Embedded TLV loyalty data tag |
| LOYALTY_ID | 0x41 | 8 | MoCom Platform specific loyalty identifier |
| LOYALTY_STATUS | 0x42 | 1 | Loyalty card/account status (see below) |
| LOYALTY_ACCOUNT_CODE | 0x43 | 32 | Loyalty account (barcode data) |
| LOYALTY_MAC_SIGNATURE | 0x44 | 8 | MoCom Platform specific MAC/Signature for integrity/ authenticity verification |

Loyalty Status

| Data Element | Value | Max Size | Description |
|---|---|---|---|
| LOYALTY_STATUS_DEACTIVATED | 0x00 | 1 | Loyalty account inactive. Not available. |
| LOYALTY_STATUS_ACTIVE | 0x01 | 1 | Loyalty account active. Available for use. |

Transaction Log
Transaction Data Elements

| Data Element | Tag | Max Size | Description |
|---|---|---|---|
| EMBEDDED_TLV_TRANSACTION_LOG | 0x60 | xx | Transaction log record data tag |
| TRANSACTION_ID | 0x61 | 16 | Transaction ID (assigned by ECR) |
| TRANSACTION_STATUS | 0x62 | 11 | Transaction status; including status byte (see below), 2-byte status word, 2-byte internal error code, 2-byte number of available transaction records, 2-byte last transaction loyalty count, 2-byte last transaction offer count |

TABLE 67-continued

Transaction Status

| Data Element | Value | Max Size | Description |
| --- | --- | --- | --- |
| TRANSACTION_STATUS_SUCCESSFUL | 0x00 | 1 | Commerce data received. Result pending. |
| TRANSACTION_STATUS_FAILED | 0x01 | 1 | Error detected. Internal error code appended. |

Offers
Offer Data Elements

| Data Element | Tag | Max Size | Description |
| --- | --- | --- | --- |
| EMBEDDED_TLV_OFFER_DATA | 0x50 | xx | Embedded TLV offer data tag |
| OFFER_ID | 0x51 | 8 | MoCom Platform specific offer identifier |
| OFFER_STATUS | 0x52 | 1 | Offer status (see below) |
| OFFER_CODE | 0x53 | 48 | Offer (UPC/EPC/GS1 Databar) barcode data |
| OFFER_TYPE_CODE | 0x54 | 9 | Offer Type (see below) |
| OFFER_MAC_SIGNATURE | 0x55 | 8 | MoCom Platform specific data security signature |
| OFFER_UPDATE_FLAG | 0x56 | 1 | Update flag (synchronization status) |
| CACHED_MERCHANT_DATA_OFFER_COUNT | 0x57 | 1 | Offer Count within Cached Merchant Data |
| EMBEDDED_TLV_CACHED_MERCHANT_DATA | 0x58 | xx | Embedded TLV Cached Merchant (Offer) Data |

| Data Element | Value | Max Size | Description |
| --- | --- | --- | --- |
| *Offer Status* | | | |
| OFFER_STATUS_DEACTIVATED | 0x00 | 1 | Offer present in data store, but not available for redemption. |
| OFFER_STATUS_ACTIVE | 0x01 | 1 | Offer present in data store. Available for redemption. |
| OFFER_STATUS_EXPIRED | 0x10 | 1 | Expired Offer |
| OFFER_STATUS_SUBMITTED | 0x20 | 1 | Offer has been presented for redemption. Result pending. |
| OFFER_STATUS_REDEEMED | 0x40 | 1 | Offer has been redeemed. |
| *Offer Type* | | | |
| OFFER_TYPE_CLASS_01 | 0x01 | 1 | Offer Class: Merchant Specific (merchant ID appended) |
| OFFER_TYPE_CLASS_02 | 0x02 | 1 | Offer Class: CPG |
| OFFER_TYPE_CLASS_03 | 0x03 | 1 | Offer Class: Misc |

Specially Formatted Data Elements

A few of the data elements included in the commerce data payload include a format byte that identifies the data encoding used for that element. The data encoding is specified by the merchant to ensure compatibility at the point of sale. The formatted data value is supplied by the MoCom platform to the wallet application. Thus, no additional interpreting/formatting is necessary between the platform, wallet, secure element, and payment terminal. It is the role of the payment terminal (or merchant POS system) to properly interpret the data and supply it to the merchant system for processing.

The following data elements shall include the format byte:
Loyalty Account Code
Offer Code Table 68 defines the possible format byte values and their corresponding encoding rule:

TABLE 68

| Format Byte | Encoding Rule | Description |
| --- | --- | --- |
| 0x00 | Hexadecimal | Each byte of data is encoded in (raw) hexadecimal format. |
| 0x01 | Binary Coded Decimal (BCD) | Each nibble represents a single digit. Thus, only decimal values are specified. A data stream containing an odd number (length) of digits includes the hex value 'F' in the first nibble of the data stream. |
| 0x02 | ASCII | Each byte represents an ACII value that is interpreted as such and handled as its corresponding CHAR value. In most cases, these data streams will be converted into a String before being passed to the merchant POS system for processing. |

A BCD encoded data value that includes the hexadecimal value 'F' in the first nibble shall identify a data stream containing an odd number of digits. Thus, the BCD data stream 12345 is encoded in 3 byte buffer as follows: 0xF12345.

Computer Readable Medium Implementation

The example embodiments described above such as, for example, the systems and procedures depicted in or discussed in connection with FIGS. 1-7 or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Figure 8:
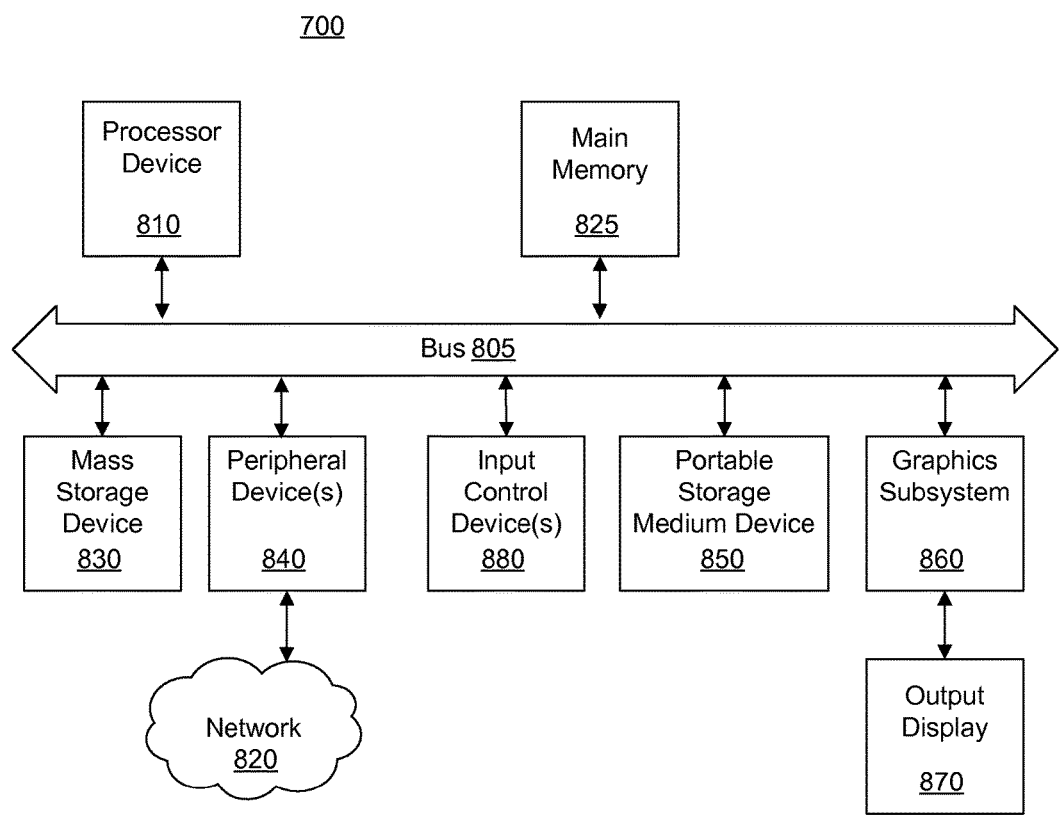
FIG. 8 is a collaboration diagram of functional modules deployed on a computer system in accordance with an example embodiment of the present invention.

FIG. 8 is a block diagram of a general and/or special purpose computer 800, in accordance with some of the example embodiments of the invention. The computer 800 may be, for example, a user device, a user computer, a client computer and/or a server computer, among other things.

The computer 800 may include without limitation a processor device 810, a main memory 825, and an interconnect bus 805. The processor device 810 may include without limitation a single microprocessor, or may include a plurality of microprocessors for configuring the computer 800 as a multi-processor system. The main memory 825 stores, among other things, instructions and/or data for execution by the processor device 810. The main memory 625 may include banks of dynamic random access memory (DRAM), as well as cache memory.

The computer 800 may further include a mass storage device 830, peripheral device(s) 840, portable storage medium device(s) 850, input control device(s) 880, a graphics subsystem 860, and/or an output display 870. For explanatory purposes, all components in the computer 800 are shown in FIG. 8 as being coupled via the bus 805. However, the computer 800 is not so limited. Devices of the computer 800 may be coupled via one or more data transport means. For example, the processor device 810 and/or the main memory 825 may be coupled via a local microprocessor bus. The mass storage device 830, peripheral device(s) 840, portable storage medium device(s) 850, and/or graphics subsystem 860 may be coupled via one or more input/output (I/O) buses. The mass storage device 830 may be a nonvolatile storage device for storing data and/or instructions for use by the processor device 810. The mass storage device 830 may be implemented, for example, with a magnetic disk drive or an optical disk drive. In a software embodiment, the mass storage device 830 is configured for loading contents of the mass storage device 830 into the main memory 825.

The portable storage medium device 850 operates in conjunction with a nonvolatile portable storage medium, such as, for example, a compact disc read only memory (CD-ROM), to input and output data and code to and from the computer 800. In some embodiments, the software for storing an internal identifier in metadata may be stored on a portable storage medium, and may be inputted into the computer 800 via the portable storage medium device 850. The peripheral device(s) 840 may include any type of computer support device, such as, for example, an input/output (I/O) interface configured to add additional functionality to the computer 800. For example, the peripheral device(s) 840 may include a network interface card for interfacing the computer 800 with a network 820.

The input control device(s) 880 provide a portion of the user interface for a user of the computer 800. The input control device(s) 880 may include a keypad and/or a cursor control device. The keypad may be configured for inputting alphanumeric characters and/or other key information. The cursor control device may include, for example, a mouse, a trackball, a stylus, and/or cursor direction keys. In order to display textual and graphical information, the computer 800 may include the graphics subsystem 860 and the output display 870. The output display 870 may include a cathode ray tube (CRT) display and/or a liquid crystal display (LCD). The graphics subsystem 860 receives textual and graphical information, and processes the information for output to the output display 870.

Each component of the computer 800 may represent a broad category of a computer component of a general and/or special purpose computer. Components of the computer 800 are not limited to the specific implementations provided here.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-Ray Disc, a DVD, a CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further includes software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein.

Thus, the invention should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system to manage contactless commerce transactions between mobile devices and payment terminals, comprising:
    a mobile device comprising:
        at least one memory operable to store commerce data and financial instrument data; and
        one or more processors coupled to the at least one memory, the one or more processors being operable to:
            detect a first tap, the first tap occurring when the mobile device is placed within a proximity to a payment terminal;
            in response to detecting the first tap, receive from the payment terminal a first select commerce command comprising an application identifier (AID) corresponding to a first commerce application;
            transmit to the payment terminal a first response based on the AID corresponding to the first select commerce command, the first response indicating to the payment terminal that the mobile device is compatible with providing commerce data;
            receive from the payment terminal a data request comprising merchant specific information comprising a merchant identifier;
            retrieve, from the at least one memory, commerce elements corresponding to the merchant specific information received in the data request, wherein the commerce elements comprise at least a portion of the commerce data;
            generate a package of data comprising the retrieved commerce elements corresponding to the merchant specific information received in the data request;
            transmit to the payment terminal a second response comprising the package of data in response to the data request;
            subsequent to transmitting the second response, receive, from the payment terminal, a select payment command comprising an application identifier (AID) corresponding to a payment application; and
            transmit, to the payment terminal, payment data corresponding to the application identifier (AID) to cause the payment terminal to:
                receive the payment data corresponding to the application identifier (AID),
                transmit, to a payment platform system, a payment authorization request, and
                receive, from the payment platform system, an authorization result indicating processing of the transaction.

2. The system of claim 1, the one or more processors being further operable to detect a second tap, the second tap occurring when the mobile device is placed within a proximity to the payment terminal, wherein the one or more processors are operable to receive the select payment command from the payment terminal in response to detecting the second tap.

3. The system of claim 1, wherein the first tap occurs in response to a first tap request received from the payment terminal.

4. The system of claim 1, wherein the payment terminal comprises a contactless reader and/or a point of sale terminal.

5. The system of claim 1, wherein the processor is further operable to cause the system to receive, from the payment terminal, enhanced commerce data comprising information identifying a redeemed coupon corresponding to the commerce elements transmitted to the payment terminal in the second response.

6. A method to manage contactless commerce transactions between mobile devices and payment terminals, comprising:
    detecting a first tap, the first tap occurring when a mobile device is placed within a proximity to a payment terminal;
    in response to detecting the first tap, receiving, by the mobile device from the payment terminal, a first select commerce command comprising an application identifier (AID) corresponding to a first commerce application;
    transmitting, by the mobile device to the payment terminal, a first response based on the AID corresponding to the first select commerce command;
    receiving, by the mobile device from the payment terminal, a data request comprising merchant specific information;
    retrieving, by the mobile device from a memory of the mobile device, commerce elements corresponding to the merchant specific information received in the data request;
    generating, by the mobile device, a package of data comprising the retrieved commerce elements corresponding to the merchant specific information received in the data request; and
    transmitting, by the mobile device to the payment terminal, a second response based on the data request, the second response comprising the package of data.

7. The method of claim 6, further comprising:
    receiving, by the mobile device, from the payment terminal a payment AID request;
    transmitting, by the mobile device, to the payment terminal the AID corresponding to a payment application;
    receiving, by the mobile device from the payment terminal, a second select command comprising the AID corresponding to the payment application;
    transmitting, by the mobile device to the payment terminal, file control information (FCI) corresponding to the payment application; and
    transmitting, by the mobile device, payment data to the payment terminal;
    wherein the payment data comprises at least a portion of the financial instrument data stored in the at least one memory.

8. The method of claim 6 or claim 7, further comprising a step of detecting a second tap, the second tap occurring when the mobile device is placed within a proximity to the payment terminal.

9. The method of claim 6 or claim 7, further comprising, detecting a second tap, the second tap occurring when the mobile device is placed within a proximity to the payment terminal, wherein the first tap and the second tap occur in response to a first tap request and a second tap request, respectively, received from the payment terminal.

10. The method of claim 6, further comprising:
   detecting a second tap, the second tap occurring when the mobile device is placed within a proximity to the payment terminal,
   in response to detecting the second tap, by the mobile device, receiving from the payment terminal a payment AID request;
   transmitting to the payment terminal the AID corresponding to a payment application;
   receiving from the payment terminal a second select command comprising the AID corresponding to the payment application;
   transmitting to the payment terminal file control information (FCI) corresponding to the payment application;
   transmitting payment data to the payment terminal, the payment data comprising at least a portion of the financial instrument data stored in the at least one memory;
   receiving from the payment terminal a third select commerce command comprising an AID corresponding to the first commerce application;
   transmitting to the payment terminal a third response based on the third select commerce command;
   receiving from the payment terminal enhanced commerce data comprising information identifying a redeemed coupon corresponding to the merchant specific commerce elements transmitted to the payment terminal in the second response; and
   transmitting to the payment terminal a fourth response based on the enhanced commerce data.

11. The method of claim 6, wherein the payment terminal comprises a contactless reader and/or a point of sale terminal.

12. A computer program product, comprising:
   a non-transitory computer-reader medium having stored thereon computer-executable program instructions that when executed by a computer cause the computer to manage contactless commerce transactions between mobile devices and payment terminals, the computer-executable program instructions comprising:
      computer-executable program instructions to detect a first tap, the first tap occurring when a mobile device is placed within a proximity to a payment terminal;
      computer-executable program instructions to receive, from the payment terminal in response to detecting the first tap, a first select commerce command comprising an application identifier (AID) corresponding to a first application;
      computer-executable program instructions to transmit to the payment terminal a first response based on the AID corresponding to the first select commerce command;
      computer-executable program instructions to receive from the payment terminal a data request comprising merchant specific information;
      computer-executable program instructions to retrieve commerce elements corresponding to the merchant specific information received in the data request;
      computer-executable program instructions to generate a package of data comprising the retrieved commerce elements corresponding to the merchant specific information received in the data request; and
      computer-executable program instructions to transmit to the payment terminal a second response based on the data request, the second response comprising the package of data.

13. The computer program product of claim 12, further comprising:
   computer-executable program instructions to receive from the payment terminal a payment AID request;
   computer-executable program instructions to transmit to the payment terminal the AID corresponding to a payment application;
   computer-executable program instructions to receive from the payment terminal a second select command comprising the AID corresponding to the payment application;
   computer-executable program instructions to transmit to the payment terminal file control information (FCI) corresponding to the payment application; and
   computer-executable program instructions to transmit payment data to the payment terminal;
   wherein the payment data comprises at least a portion of the financial instrument data stored in the at least one memory.

14. The computer program product of claim 12 or claim 13, further comprising computer-executable program instructions to detect a second tap, the second tap occurring when the mobile device is placed within a proximity to the payment terminal.

15. The computer program product of claim 12, further comprising computer-executable program instructions to detect a second tap, the second tap occurring when the mobile device is placed within a proximity to the payment terminal, wherein the first tap and the second tap occur in response to a first tap request and a second tap request, respectively, received from the payment terminal.

16. The computer program product of claim 12, further comprising:
   computer-executable program instructions to detect a second tap, the second tap occurring when the mobile device is placed within a proximity to the payment terminal,
   in response to detecting the second tap, computer-executable program instructions to receive from the payment terminal a payment AID request;
   computer-executable program instructions to transmit to the payment terminal the AID corresponding to a payment application;
   computer-executable program instructions to receive from the payment terminal a second select command comprising the AID corresponding to the payment application;
   computer-executable program instructions to transmit to the payment terminal file control information (FCI) corresponding to the payment application;
   computer-executable program instructions to transmit payment data to the payment terminal, the payment data comprising at least a portion of the financial instrument data stored in the at least one memory;

computer-executable program instructions to receive from the payment terminal a third select commerce command comprising an AID corresponding to the first commerce application;

computer-executable program instructions to transmit to the payment terminal a third response based on the third select commerce command;

computer-executable program instructions to receive from the payment terminal enhanced commerce data; and computer-executable program instructions to transmit to the payment terminal a fourth response based on the enhanced commerce data.

17. The computer program product of claim 12, wherein the payment terminal comprises a contactless reader and/or a point of sale terminal.

* * * * *